United States Patent
Hayashi et al.

(10) Patent No.: US 6,569,530 B2
(45) Date of Patent: May 27, 2003

(54) MAGNETIC RECORDING MEDIUM AND MAGNETIC COMPOSITE PARTICLES OR MAGNETIC RECORDING MEDIUM

(75) Inventors: Kazuyuki Hayashi, Hiroshima (JP); Keisuke Iwasaki, Hiroshima (JP); Mamoru Kamigaki, Hatsukaichi (JP); Hiroko Morii, Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 10/061,357

(22) Filed: Feb. 4, 2002

(65) Prior Publication Data

US 2002/0164502 A1 Nov. 7, 2002

(30) Foreign Application Priority Data

Feb. 7, 2001 (JP) ........................................ 2001-031517

(51) Int. Cl.$^7$ .......................... G11B 5/706; B32B 15/16
(52) U.S. Cl. ........................ 428/403; 428/404; 428/405; 428/407; 428/428; 428/328; 428/329; 428/694 BS; 428/694 BN; 428/694 BA
(58) Field of Search ................................. 428/403, 404, 428/405, 407, 428, 329, 694 BS, 694 BN, 694 BA

(56) References Cited

FOREIGN PATENT DOCUMENTS

| EP | 0 924 690 A2 | 6/1999 |
|----|--------------|--------|
| JP | 61-104601 | 5/1986 |

*Primary Examiner*—Stevan A. Resan
(74) *Attorney, Agent, or Firm*—Nixon & Vanderhye P.C.

(57) ABSTRACT

A magnetic recording medium comprises:
  a non-magnetic base film; and
  a magnetic recording layer comprising a binder resin and magnetic composite particles having an average particle diameter of 0.02 to 0.70 μm, comprising
    magnetic particles as core particles,
    a coating formed on surface of said magnetic particle, comprising at least one organosilicon compound selected from the group consisting of:
      (1) organosilane compounds obtainable from alkoxysilane compounds, and
      (2) polysiloxanes or modified polysiloxanes, and
    a phthalocyanine-based pigments coat formed on said coating layer comprising said organosilicon compound, in an amount of 1 to 100 parts by weight based on 100 parts by weight of said magnetic particles.

29 Claims, No Drawings

MAGNETIC RECORDING MEDIUM AND MAGNETIC COMPOSITE PARTICLES OR MAGNETIC RECORDING MEDIUM

BACKGROUND OF THE INVENTION

The present invention relates to a magnetic recording medium and magnetic composite particles for magnetic recording medium, and more particularly, to a magnetic recording medium having excellent strength, surface smoothness and durability as well as low light transmittance, and magnetic composite particles used for such a magnetic recording medium.

With a development of miniaturized and lightweight video or audio magnetic recording and reproducing apparatuses for long-time recording, magnetic recording media such as a magnetic tape and magnetic disk have been increasingly and strongly required to have a higher performance, namely, a higher recording density, higher output characteristic, in particular, an improved frequency characteristic and a lower noise level.

Video tapes have recently been required more and more to have a higher picture quality, and the frequencies of carrier signals recorded in recent video tapes are higher than those recorded in conventional video tapes. In other words, the signals in the short-wave region have come to be used, and as a result, the magnetization depth from the surface of a magnetic tape has come to be remarkably small.

With respect to short wavelength signals, a reduction in the thickness of a magnetic recording layer is also strongly demanded in order to improve the high output characteristics, especially, the S/N ratio of a magnetic recording medium.

With a recent tendency toward reduction in thickness of the magnetic recording layer, magnetic recording media themselves tend to be poor in durability. Therefore, the magnetic recording media have been strongly required to have an improved strength and durability in themselves.

As to this fact, in Japanese Patent Application Laid-Open (KOKAI) No. 5-298679(1993), it is described that "... With recent remarkable development of magnetic recording techniques, higher image quality and higher sound quality have been required. For satisfying these requirements, it has been attempted to improve the electromagnetic performance of magnetic recording media, especially to reduce the size of ferromagnetic particles and increase the density of the particles in the magnetic recording layer. In addition, the magnetic tape has been required to have a smoother surface in order to reduce its noise level and improve its C/N ratio .... However, during running of the magnetic tape within a magnetic recording/reproducing device, the friction coefficient of contact between the magnetic recording layer of the magnetic tape and the device is considerably increased, so that the magnetic recording layer tends to be severely damaged or peeled from the magnetic tape even after used for a short period of time. In particular, in the case of video tapes, since the magnetic recording medium is traveled at a high speed while contacting with a video head, ferromagnetic particles contained therein tend to be fallen off from the magnetic recording layer, resulting in clogging of the magnetic head. Therefore, the magnetic recording medium has been strongly required to show an improved running durability. . . . ".

Hitherto, in order to enhance durability of magnetic recording media themselves, oxides particles such as alumina have been added as abrasives into a magnetic recording layer thereof. However, it is known that when a large amount of alumina having a poor dispersibility is added to the magnetic recording layer, the obtained magnetic recording media suffer from not only increased drop-out, but also deteriorated surface smoothness. Therefore, it has been required to provide magnetic particles capable of maintaining a good durability of magnetic recording media even though the amount of abrasives such as alumina added is reduced.

In the progress of reduction in thickness of the magnetic recording layer, such a magnetic recording medium having at least one undercoat layer formed on a non-magnetic base film which comprises a binder resin and non-magnetic particles dispersed in the binder resin such as acicular hematite particles (hereinafter referred to as "non-magnetic undercoat layer"), has been proposed and practically used in order to solve problems such as poor surface properties, deteriorated electromagnetic performance, etc. of the magnetic recording layer (Japanese Patent Publication (KOKOKU) No. 6-93297(1994) and Japanese Patent Application Laid-Open (KOKAI) Nos. 62-159338(1987), 63-187418(1988), 4-167225(1992), 4-325915(1992), 5-73882(1993) and 5-182177(1993)).

However, when the magnetic recording layer is formed on such a non-magnetic undercoat layer, the obtained magnetic recording medium is deteriorated in durability though the surface smoothness thereof is improved.

As to this fact, in Japanese Patent Application Laid-Open (KOKAI) No. 5-182177(1993), it is described that ". . . Although the adverse influence of rough surface of the base film is avoided by forming a thick non-magnetic undercoat film on the base film and then forming the magnetic layer as an upper layer thereon, there still remain problems such as head abrasion and poor durability. The reason therefor is considered to be that since thermosetting resins have been conventionally used as the binder resin of the non-magnetic undercoat layer, the frictional contact between the magnetic layer and the magnetic head or other members is performed under a non-buffering condition because of the hardened undercoat layer, or the magnetic recording medium having such a undercoat layer shows a somewhat poor flexibility. . . . ".

Thus, it has been required to provide magnetic particles for magnetic recording media which are capable of maintaining and improving strength and durability of the magnetic recording media even when the magnetic recording layer is formed on the non-magnetic undercoat layer.

The end portion of a magnetic recording medium such as a magnetic tape, especially, a video tape is judged by detecting a portion of the magnetic recording medium at which the light transmittance is large by a video deck. If the light transmittance of the whole part of a magnetic recording layer is made large by the production of a thinner magnetic recording medium or the ultrafine magnetic particles dispersed in the magnetic recording layer, it is difficult to detect the portion having a large light transmittance by a video deck. For reducing the light transmittance of the whole part of a magnetic recording layer, carbon black fine particles or the like is added to the magnetic recording layer. It is, therefore, essential to add carbon black or the like to a magnetic recording layer in the present video tapes.

However, addition of a large amount of non-magnetic particles such as carbon black fine particles impairs not only the enhancement of the magnetic recording density but also the development of a thinner recording layer. In order to reduce the magnetization depth from the surface of the magnetic tape and to produce a thinner magnetic recording layer, it is strongly demanded to reduce, as much as possible, the quantity of non-magnetic particles such as carbon black fine particles which are added to a magnetic recording layer.

Consequently, it has been strongly demanded to provide a magnetic recording medium capable of exhibiting a low light transmittance even when the amount of carbon black fine particles added to a magnetic recording layer thereof is reduced as low as possible.

It is known to use magnetic particles on which carbon black is adhered in an amount of 0.5 to 10 parts by weight based on 100 parts by weight of the magnetic particles, in order to not only reduce an amount of fine carbon black particles incorporated into the magnetic recording layer but also lower a light transmittance of the obtained magnetic recording media (Japanese Patent Application Laid-Open (KOKAI) Nos. 2000-36404, 2000-138115, 2001-2424, 2001-2425, 2001-15317 and 2001-15318).

At present, it has been strongly required to provide magnetic particles capable of producing magnetic recording media having excellent strength and surface smoothness as well as low light transmittance. However, such magnetic particles satisfying the above properties have not been obtained.

Namely, the magnetic particles described in Japanese Patent Application Laid-Open (KOKAI) Nos. 2000-36404, 2000-138115, 2001-2424, 2001-2425, 2001-15317 and 2001-15318 are improved in light transmittance and dispersibility because carbon black is adhered onto the surface of these particles, but fail to exhibit a sufficient resin absorption as shown below in Comparative Examples. Therefore, when the magnetic particles are used for production of magnetic recording media, the obtained magnetic recording media are poor in strength.

As a result of the present inventors' earnest studies for solving the above conventional problems, it has been found that by using as magnetic particles magnetic composite particles having an average major axial diameter of 0.02 to 0.70 $\mu$m, which comprise magnetic particles as core particles, a coating layer comprising at least one organosilicon compound formed on the surface of each core particle, and a phthalocyanine-based pigments coat formed on at least a part of the surface of the coating layer composed of at least one organosilicon compound, the obtained magnetic recording medium can exhibit a high strength, a smooth surface, a lower light transmittance and an excellent durability. The present invention has been attained on the basis of this finding.

SUMMARY OF THE INVENTION

An object of the present invention is to provide a magnetic recording medium exhibiting a high strength, a smooth surface, an excellent duarability and a lower light transmittance.

Another object of the present invention is to provide magnetic composite particles capable of providing a magnetic recording medium exhibiting a high strength, a smooth surface, an excellent duarability and a lower light transmittance.

To accomplish the aims, in a first aspect of the present invention, there is provided a magnetic recording medium comprising:

a non-magnetic base film; and a magnetic recording layer comprising a binder resin and magnetic composite particles having an average particle diameter of 0.02 to 0.70 $\mu$m, comprising magnetic particles as core particles,
a coating formed on surface of said magnetic particle, comprising at least one organosilicon compound selected from the group consisting of:
(1) organosilane compounds obtainable from alkoxysilane compounds, and
(2) polysiloxanes or modified polysiloxanes, and
a phthalocyanine-based pigments coat formed on said coating layer comprising said organosilicon compound, in an amount of 1 to 100 parts by weight based on 100 parts by weight of said magnetic particles.

In a second aspect of the present invention, there is provided a magnetic recording medium comprising:

a non-magnetic base film; and a magnetic recording layer comprising a binder resin and magnetic composite particles having an average particle diameter of 0.02 to 0.70 $\mu$m, comprising
magnetic particles coated with at least one compound selected from the group consisting of hydroxides of aluminum, oxides of aluminum, hydroxides of silicon and oxides of silicon as core particles,
a coating formed on surface of said magnetic particle coated, comprising at least one organosilicon compound selected from the group consisting of:
(1) organosilane compounds obtainable from alkoxysilane compounds, and
(2) polysiloxanes or modified polysiloxanes, and
a phthalocyanine-based pigments coat formed on said coating layer comprising said organosilicon compound, in an amount of 1 to 100 parts by weight based on 100 parts by weight of said magnetic particles.

In a third aspect of the present invention, there are provided a magnetic recording medium comprising:

a non-magnetic base film; and a magnetic recording layer comprising a binder resin and magnetic composite particles having an average particle diameter of 0.02 to 0.70 $\mu$m, comprising
as core particles magnetic particles having a coating formed on the surface of the magnetic particle, comprising at least one organosilicon compound selected from the group consisting of:
(1) organosilane compounds obtainable from alkoxysilane compounds, and
(2) polysiloxanes or modified polysiloxanes, and
a carbon black coat formed on at least a part of the surface of said coating comprising the organosilicon compound, in an amount of 1 to 40 parts by weight based on 100 parts by weight of the magnetic particles,
a coating formed on surface of the carbon black coat, comprising at least one organosilicon compound selected from the group consisting of:
(1) organosilane compounds obtainable from alkoxysilane compounds, and
(2) polysiloxanes or modified polysiloxanes, and
a phthalocyanine-based pigments coat formed on said coating layer comprising said organosilicon compound, in an amount of 1 to 100 parts by weight based on 100 parts by weight of said magnetic particles.

In a fourth aspect of the present invention, there is provided a magnetic recording medium comprising:

a non-magnetic base film; and a magnetic recording layer comprising a binder resin and magnetic composite particles having an average particle diameter of 0.02 to 0.70 $\mu$m, comprising as core particles magnetic particles coated with at least one compound selected from the group consisting of hydroxides of aluminum, oxides of aluminum, hydroxides of silicon and oxides of silicon as core particles and having a coating formed on the surface of the magnetic particle coated, comprising at least one organosilicon compound selected from the group consisting of:
  (1) organosilane compounds obtainable from alkoxysilane compounds, and
  (2) polysiloxanes or modified polysiloxanes, and
a carbon black coat formed on at least a part of the surface of said coating comprising the organosilicon compound, in an amount of 1 to 40 parts by weight based on 100 parts by weight of the magnetic particles,
a coating formed on surface of the carbon black coat, comprising at least one organosilicon compound selected from the group consisting of:
  (1) organosilane compounds obtainable from alkoxysilane compounds, and
  (2) polysiloxanes or modified polysiloxanes, and
a phthalocyanine-based pigments coat formed on said coating layer comprising said organosilicon compound, in an amount of 1 to 100 parts by weight based on 100 parts by weight of said magnetic particles.

In a fifth aspect of the present invention, there are provided a magnetic recording medium comprising:
a non-magnetic base film;
a non-magnetic undercoat layer formed on the non-magnetic base film; and
a magnetic recording layer formed on the non-magnetic undercoat layer, comprising a binder resin and magnetic composite particles having an average particle diameter of 0.02 to 0.70 μm, comprising
magnetic particles as core particles,
a coating formed on surface of said magnetic particle, comprising at least one organosilicon compound selected from the group consisting of:
  (1) organosilane compounds obtainable from alkoxysilane compounds, and
  (2) polysiloxanes or modified polysiloxanes, and
a phthalocyanine-based pigments coat formed on said coating layer comprising said organosilicon compound, in an amount of 1 to 100 parts by weight based on 100 parts by weight of said magnetic particles.

In a sixth aspect of the present invention, there are provided magnetic composite particles having an average particle diameter of 0.02 to 0.70 μm, comprising
magnetic particles as core particles,
a coating formed on surface of said magnetic particle, comprising at least one organosilicon compound selected from the group consisting of:
  (1) organosilane compounds obtainable from alkoxysilane compounds, and
  (2) polysiloxanes or modified polysiloxanes, and
a phthalocyanine-based pigments coat formed on said coating layer comprising said organosilicon compound, in an amount of 1 to 100 parts by weight based on 100 parts by weight of said magnetic particles.

In a seventh aspect of the present invention, there is provided magnetic composite particles having an average particle diameter of 0.02 to 0.70 μm, comprising
magnetic particles coated with at least one compound selected from the group consisting of hydroxides of aluminum, oxides of aluminum, hydroxides of silicon and oxides of silicon as core particles,
a coating formed on surface of said magnetic particle coated, comprising at least one organosilicon compound selected from the group consisting of:
  (1) organosilane compounds obtainable from alkoxysilane compounds, and
  (2) polysiloxanes or modified polysiloxanes, and
a phthalocyanine-based pigments coat formed on said coating layer comprising said organosilicon compound, in an amount of 1 to 100 parts by weight based on 100 parts by weight of said magnetic particles.

In an eighth aspect of the present invention, there are provided magnetic composite particles having an average particle diameter of 0.02 to 0.70 μm, comprising
as core particles magnetic particles having a coating formed on the surface of the magnetic particle, comprising at least one organosilicon compound selected from the group consisting of:
  (1) organosilane compounds obtainable from alkoxysilane compounds, and
  (2) polysiloxanes or modified polysiloxanes, and
a carbon black coat formed on at least a part of the surface of said coating comprising the organosilicon compound, in an amount of 1 to 40 parts by weight based on 100 parts by weight of the magnetic particles,
a coating formed on surface of the carbon black coat, comprising at least one organosilicon compound selected from the group consisting of:
  (1) organosilane compounds obtainable from alkoxysilane compounds, and
  (2) polysiloxanes or modified polysiloxanes, and
a phthalocyanine-based pigments coat formed on said coating layer comprising said organosilicon compound, in an amount of 1 to 100 parts by weight based on 100 parts by weight of said magnetic particles.

In a ninth aspect of the present invention, there are provided magnetic composite particles having an average particle diameter of 0.02 to 0.70 μm, comprising
as core particles magnetic particles coated with at least one compound selected from the group consisting of hydroxides of aluminum, oxides of aluminum, hydroxides of silicon and oxides of silicon as core particles and having a coating formed on the surface of the magnetic particle coated, comprising at least one organosilicon compound selected from the group consisting of:
  (1) organosilane compounds obtainable from alkoxysilane compounds, and
  (2) polysiloxanes or modified polysiloxanes, and
a carbon black coat formed on at least a part of the surface of said coating comprising the organosilicon compound, in an amount of 1 to 40 parts by weight based on 100 parts by weight of the magnetic particles,
a coating formed on surface of the carbon black coat, comprising at least one organosilicon compound selected from the group consisting of:
  (1) organosilane compounds obtainable from alkoxysilane compounds, and
  (2) polysiloxanes or modified polysiloxanes, and
a phthalocyanine-based pigments coat formed on said coating layer comprising said organosilicon compound, in an amount of 1 to 100 parts by weight based on 100 parts by weight of said magnetic particles.

In a tenth aspect of the present invention, there is provided a magnetic recording medium comprising:

a non-magnetic base film; and a magnetic recording layer comprising a binder resin and magnetic composite particles having an average particle diameter of 0.02 to 0.70 μm, comprising:

magnetic acicular metal particles containing iron as a main component which contain Co, Al, Ni, P, Zn, Si, B or rare earth elements, or magnetic acicular iron alloy particles containing Co, Al, Ni, P, Zn, Si, B or rare earth elements, as core particles, a coating formed on surface of said magnetic acicular particle, comprising at least one organosilicon compound selected from the group consisting of:

(1) organosilane compounds obtainable from alkoxysilane compounds, and (2) polysiloxanes or modified polysiloxanes, and a phthalocyanine-based pigments coat formed on said coating layer comprising said organosilicon compound, in an amount of 1 to 100 parts by weight based on 100 parts by weight of said magnetic particles.

In an eleventh aspect of the present invention, there are provided magnetic composite particles for a magnetic recording medium, having an average particle diameter of 0.02 to 0.70 μm, comprising:

magnetic acicular metal particles containing iron as a main component which contain Co, Al, Ni, P, Zn, Si, B or rare earth elements, or magnetic acicular iron alloy particles containing Co, Al, Ni, P, Zn, Si, B or rare earth elements, as core particles, a coating formed on surface of said magnetic acicular particle, comprising at least one organosilicon compound selected from the group consisting of:

(1) organosilane compounds obtainable from alkoxysilane compounds, and (2) polysiloxanes or modified polysiloxanes, and a phthalocyanine-based pigments coat formed on said coating layer comprising said organosilicon compound, in an amount of 1 to 100 parts by weight based on 100 parts by weight of said magnetic particles.

In a twelfth aspect of the present invention, there is provided in a method of forming a magnetic recording medium comprising a non-magnetic base film, and a magnetic recording layer comprising a binder resin and magnetic particles, the improvement comprising using as magnetic particles magnetic composite particles having an average particle diameter of 0.02 to 0.70 μm, comprising:

magnetic particles as core particles, a coating formed on surface of said magnetic particle, comprising at least one organosilicon compound selected from the group consisting of:

(1) organosilane compounds obtainable from alkoxysilane compounds, and (2) polysiloxanes or modified polysiloxanes, and a phthalocyanine-based pigments coat formed on said coating layer comprising said organosilicon compound, in an amount of 1 to 100 parts by weight based on 100 parts by weight of said magnetic particles.

DETAILED DESCRIPTION OF THE INVENTION

The present invention is now described in detail below.

First, the magnetic composite particles used as magnetic particles contained in a magnetic recording layer of a magnetic recording medium according to the present invention are described.

The magnetic composite particle used as a magnetic particle contained in a magnetic recording layer of a magnetic recording medium, comprise:

a magnetic particle as a core particle;

a coating layer formed on the surface of the magnetic particle, comprising at least one organosilicon compound, and a phthalocyanine-based pigments coat formed on a part of the coating layer comprising at least one organosilicon compound; and have an average major axis diameter of 0.02 to 0.70 μm.

As the magnetic core particles used in the present invention, there may be the following magnetic particles (A) and magnetic composite particles precursor (B) using the magnetic particles as core particles are exemplified.

In the consideration of blackness of the magnetic composite particles, the magnetic composite particles precursor (B) comprising the magnetic particles, a coating layer formed on the surface of each magnetic particles, comprising at least one organosilicon compound, and a carbon black coat formed on the coating layer comprising at least one organosilicon compound, are preferred.

The particle shape of the magnetic particles as the core particles used in the present invention may include not only acicular shape such as needle-like shape, spindle shape, rice ball shape but also plate shape or the like.

As the magnetic particles used as core particles in the present invention, there may be exemplified (i) acicular magnetic particles, e.g., cobalt-coated magnetic iron oxide particles obtained by coating magnetic iron oxide particles such as maghemite particles ($\gamma$-$Fe_2O_3$) and magnetite particles ($FeO_x \cdot Fe_2O_3$, $0<x\leq1$) with Co, or Co and Fe; cobalt-coated magnetic iron oxide particles obtained by incorporating elements other than Fe such as Co, Al, Ni, P, Zn, Si, B and rare earth metals into the above cobalt-coated magnetic iron oxide particles; magnetic metal particles containing iron as a main component; and magnetic iron alloy particles containing elements other than Fe such as Co, Al, Ni, P, Zn, Si, B and rare earth metals; (ii) plate-shaped magnetic particles, e.g., plate-shaped magnetoplumbite-type ferrite particles containing Ba, Sr or Ba—Sr; and plate-shaped magnetoplumbite-type ferrite particles obtained by incorporating one or more coercive force reducing agents selected from the group consisting of divalent and tetravalent metals such as Co, Ni, Zn, Mn, Mg, Ti, Sn, Zr, Nb, Cu and Mo, into the above ferrite particles; and the like. Meanwhile, the magnetic particles used in the present invention may include either the acicular particles, the plate-shaped particles or both thereof unless otherwise specified.

With the consideration of the short-wavelength recording and the high-density recording, magnetic acicular metal particles containing iron as a main component and magnetic acicular iron-based alloy particles containing elements other than Fe at least one selected from the group consisting of Co, Al, Ni, P, Si, Zn, B, rare earth metals (Nd, La, Y, etc.) or the like are preferable.

Specifically, the magnetic acicular iron-based alloy particles comprising (i) iron and Al; (ii) iron, Co and Al; (iii) iron, Al and at least one rare-earth metal such as Nd, La and Y, or (iv) iron, Co, Al and at least one rare-earth metal such as Nd, La and Y is more preferable from the point of the durability of the magnetic recording medium.

More specifically, the magnetic acicular iron-based alloy particles may be exemplified as follows.

1) Magnetic acicular iron-based alloy particles comprises iron; and cobalt of usually 0.05 to 40% by weight, preferably 1.0 to 35% by weight, more preferably 3 to 30% by weight (calculated as Co) based on the weight of the magnetic acicular iron-based alloy particles.

2) Magnetic acicular iron-based alloy particles comprise iron; and aluminum of usually 0.05 to 10% by weight, preferably 0.1 to 7% by weight (calculated as Al) based on the weight of the magnetic acicular iron-based alloy particles.

3) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; and aluminum of usually 0.05 to 10% by weight, preferably 0.1 to 7% by weight (calculated as Al) based on the weight of the magnetic acicular iron-based alloy particles.

4) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; and at least one selected from the group consisting of Nd, La and Y of usually 0.05 to 10% by weight, preferably 0.1 to 7% by weight (calculated as the corresponding element) based on the weight of the magnetic acicular iron-based alloy particles.

5) Magnetic acicular iron-based alloy particles comprises iron; aluminum of usually 0.05 to 10% by weight, preferably 0.1 to 7% by weight (calculated as Al) based on the weight of the magnetic acicular iron-based alloy particles; and at least one selected from the group consisting of Nd, La and Y of usually 0.05 to 10% by weight, preferably 0.1 to 7% by weight (calculated as the corresponding element) based on the weight of the magnetic acicular iron-based alloy particles.

6) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; aluminum of usually 0.05 to 10% by weight, preferably 0.1 to 7% by weight (calculated as Al) based on the weight of the magnetic acicular iron-based alloy particles; and at least one selected from the group consisting of Nd, La and Y of usually 0.05 to 10% by weight, preferably 0.1 to 7% by weight (calculated as the corresponding element) based on the weight of the magnetic acicular iron-based alloy particles.

7) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

8) Magnetic acicular iron-based alloy particles comprises iron; aluminum of usually 0.05 to 10% by weight, preferably 0.1 to 7% by weight (calculated as Al) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

9) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; aluminum of usually 0.05 to 10% by weight, preferably 0.1 to 7% by weight (calculated as Al) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

10) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; at least one selected from the group consisting of Nd, La and Y of usually 0.05 to 10% by weight, preferably 0.1 to 7% by weight (calculated as the corresponding element) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

11) Magnetic acicular iron-based alloy particles comprises iron; aluminum of usually 0.05 to 10% by weight, preferably 0.1 to 7% by weight (calculated as Al) based on the weight of the magnetic acicular iron-based alloy particles; at least one selected from the group consisting of Nd, La and Y of ordinarily 0.05 to 10% by weight, preferably 0.1 to 7% by weight (calculated as the corresponding element) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

12) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; aluminum of usually 0.05 to 10% by weight, preferably 0.1 to 7% by weight (calculated as Al) based on the weight of the magnetic acicular iron-based alloy particles; at least one selected from the group consisting of Nd, La and Y of usually 0.05 to 10% by weight, preferably 0.1 to 7% by weight (calculated as the corresponding element) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

The iron content in the particles is the balance, and is preferably 50 to 99% by weight, more preferably 60 to 95% by weight (calculated as Fe) based on the weight of the magnetic acicular metal particles containing iron as a main component or the magnetic acicular iron-based alloy particles.

The acicular magnetic particles as the core particles have an average major axis diameter of usually 0.02 to 0.70 $\mu$m, preferably 0.03 to 0.60 $\mu$m, more preferably 0.04 to 0.50 $\mu$m.

When the average major axis diameter is more than 0.7 $\mu$m, the obtained magnetic composite particles also may become coarse particles. When such coarse particles are used for forming a magnetic recording layer, a coating film formed on the non-magnetic base film or non-magnetic undercoat layer may tend to be deteriorated in surface smoothness. When the average major axis diameter is less than 0.02 μm, the particles may tend to be agglomerated by the increase of intermolecular force therebetween due to such fine particles. As a result, it may become difficult to form a uniform coating layer composed of organosilicon compound on the surface of the core particles, and uniformly adhere the phthalocyanine-based pigment onto the surface of the coating layer.

The aspect ratio (=average major axis diameter:average minor axis diameter, hereinafter referred to merely as "aspect ratio") of the acicular magnetic particles as the core particles is usually 2.0:1 to 20.0:1, preferably 2.5:1 to 18.0:1, more preferably 3.0:1 to 15.0:1. When the aspect ratio is more than 20.0:1, the particles may be entangled with each other, so that the agglomeration of the magnetic particles tends to occur due to the increased intermolecular force therebetween. As a result, it is difficult to uniformly coat with an organosilicon compound and to uniformly adhere with phthalocyanine-based pigments through the organosilicon compound. On the other hand, when the aspect ratio is less than 2.0:1, it may be difficult to obtain a magnetic recording medium having a sufficient strength.

The plate-shaped magnetic particles as the core particles have an average particle diameter (=average plate surface diameter) of preferably 0.02 to 0.20 μm, more preferably 0.02.5 to 0.20 μm, still more preferably 0.03 to 0.20 μm.

When the average major axis diameter is more than 0.2 μm, the obtained magnetic composite particles may tend to become coarse particles. When such coarse particles are used for forming a magnetic recording layer, a coating film formed on the non-magnetic base film or non-magnetic undercoat layer may tend to be deteriorated in surface smoothness. When the average major axis diameter is less than 0.02 μm, the particles may tend to be agglomerated by the increase of intermolecular force therebetween due to such fine particles. As a result, it may become difficult to form a uniform coating layer composed of organosilicon compound on the surface of the core particles, and uniformly adhere the phthalocyanine-based pigment onto the surface of the coating layer.

The plate ratio (=average plate surface diameter/average thickness), hereinafter referred to merely as "plate ratio") of the plate-shaped magnetic particles as the core particles is usually 2.0:1 to 20.0:1, preferably 2.5:1 to 15.0:1, more preferably 3.0:1 to 10.0:1. When the plate ratio is more than 20.0:1, such particles tend to cause surface-to-surface contact with each other and be stacked together. As a result, it is difficult to uniformly coat with an organosilicon compound and to uniformly adhere with phthalocyanine-based pigments through the organosilicon compound. On the other hand, when the plate ratio is less than 2.0:1, it may be difficult to obtain a magnetic recording medium having a sufficient strength.

The geometrical standard deviation of the particle size of the magnetic particles as the core particles is usually not more than 2.0, preferably 1.9, more preferably not more than 1.8. If the geometrical standard deviation of the particle size thereof exceeds 2.0, due to the coarse particles, it is difficult to uniformly coat with an organosilicon compound and to uniformly adhere with phthalocyanine-based pigments through the organosilicon compound. From the point of view of industrial productivity, the lower limit thereof is preferably 1.01.

The BET specific surface area of the magnetic particles as the core particles is usually 15 to 200 $m^2/g$, preferably 20 to 150 $m^2/g$, more preferably 25 to 100 $m^2/g$. If the BET specific surface area thereof is less than 15 $m^2/g$, the magnetic particles may be coarse particles or large particles produced by sintering a particle and between particles, so that the magnetic composite particles produced by using such magnetic particles may be coarse particles, which are apt to exert a deleterious influence on the surface smoothness of the coating film formed using such particles. On the other hand, if the BET specific surface area thereof is more than 200 $m^2/g$, the increase of the intermolecular force due to the fine particles. As a result, it may be difficult to uniformly coat with the organosilicon compounds, and to uniformly adhere with the phthalocyanine-based pigments on the coating layer composed of the organosilicon compounds.

The lower limit of the blackness of the magnetic particles, when represented by the L* value, is usually more than 18.0, and the upper limit thereof is usually 34.0, preferably 33.0. When the L* value is more than the above upper limit, it is difficult to obtain the magnetic composite particles having an excellent blackness because of higher lightness.

In the case of the magnetic composite particles precursor (B), the lower limit of the blackness thereof, when represented by the L* value, is usually 15.0, and the upper limit thereof is usually 27.0, preferably 26.0.

The resin adsorptivity of the magnetic particles as the core particles is usually not more than 60%.

As to the magnetic properties of the magnetic particles as core particles, the coercive force is usually 39.8 to 318.3 kA/m (500 to 4000 Oe), preferably 43.8 to 318.3 kA/m (550 to 4000 Oe), and the saturation magnetization is usually 35 to 170 $Am^2/kg$ (35 to 170 emu/g), preferably 40 to 170 $Am^2/kg$ (40 to 170 emu/g).

As to the magnetic properties of the Co-coated magnetic iron oxide particles as core particles, the coercive force is usually 39.9 to 135.3 kA/m (500 to 1700 Oe), preferably 43.8 to 135.3 kA/m (550 to 1700 Oe), and the saturation magnetization is usually 60 to 90 $Am^2/kg$ (60 to 90 emu/g), preferably 65 to 90 $Am^2/kg$ (65 to 90 emu/g). As to the magnetic properties of the magnetic acicular metal particles containing iron as a main component and magnetic acicular iron-based alloy particles as core particles, the coercive force is usually 63.7 to 278.5 kA/m (800 to 3500 Oe), preferably 71.6 to 278.5 kA/m (900 to 3500 Oe), and the saturation magnetization is usually 90 to 170 $Am^2/kg$ (90 to 170 emu/g), preferably 100 to 170 $Am^2/kg$ (100 to 170 emu/g). As to the magnetic properties of the plate-shaped magnetoplumbite-type ferrite particles as core particles, the coercive force is usually 39.8 to 318.3 kA/m (500 to 4000 Oe), preferably 51.7 to 318.3 kA/m (650 to 4000 Oe), and the saturation magnetization is usually 35 to 70 $Am^2/kg$ (35 to 70 emu/g), preferably 40 to 70 $Am^2/kg$ (40 to 70 emu/g).

Next, the magnetic composite particles precursor (B) is described below.

The magnetic composite particles precursor (B) comprise:
- as core particles the magnetic particles having an average major axis diameter of 0.02 to 0.70 μm;
- a coating formed on the surface of the magnetic particles, comprising at least one organosilicon compound selected from the group consisting of:
  (1) organosilane compounds obtainable from alkoxysilane compounds, and
  (2) polysiloxanes or modified polysiloxanes, and
- a carbon black coat formed on at least a part of the surface of the said coating layer comprising the said organosilicon compound, in an amount of 1 to 40 parts by weight based on 100 parts by weight of the said magnetic particles.

The properties of the magnetic particles used as the core particles of the magnetic composite particles precursor (B) are substantially the same as those of the magnetic particles (A), except that the an average major axis diameter of 0.01 to 0.65 μm.

The coating formed on the surface of the magnetic particles comprises at least one organosilicon compound selected from the group consisting of (1) organosilane compounds obtainable from alkoxysilane compounds; and (2) polysiloxanes and modified polysiloxanes selected from the group consisting of (2-A) polysiloxanes modified with at least one compound selected from the group consisting of polyethers, polyesters and epoxy compounds (hereinafter referred to merely as "modified polysiloxanes"), and (2-B) polysiloxanes whose molecular terminal is modified with at least one group selected from the group consisting of carboxylic acid groups, alcohol groups and a hydroxyl group (hereinafter referred to merely as "terminal-modified polysiloxanes").

The organosilane compounds (1) may be produced from alkoxysilane compounds represented by the formula (I):

wherein $R^1$ is $C_6H_5-$, $(CH_3)_2CHCH_2-$ or $n-C_bH_{2b+1}-$ (wherein b is an integer of 1 to 18); X is $CH_3O-$ or $C_2H_5O-$; and a is an integer of 0 to 3.

The drying or heat-treatment of the alkoxysilane compounds may be conducted, for example, at a temperature of usually 40 to 150° C., preferably 60 to 120° C. for usually 10 minutes to 12 hours, preferably 30 minutes to 3 hours.

Specific examples of the alkoxysilane compounds may include methyltriethoxysilane, dimethyldiethoxysilane, phenyltriethyoxysilane, diphenyldiethoxysilane, methyltrimethoxysilane, dimethyldimethoxysilane, phenyltrimethoxysilane, diphenyldimethoxysilane, isobutyltrimethoxysilane, decyltrimethoxysilane or the like. Among these alkoxysilane compounds, in view of the desorption percentage and the adhering effect of carbon black, methyltriethoxysilane, phenyltriethyoxysilane, methyltrimethoxysilane, dimethyldimethoxysilane and isobutyltrimethoxysilane are preferred, and methyltriethoxysilane and methyltrimethoxysilane are more preferred.

As the polysiloxanes (2), there may be used those compounds represented by the formula (II):

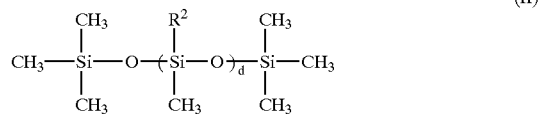

wherein $R^2$ is $H-$ or $CH_3-$, and d is an integer of 15 to 450.

Among these polysiloxanes, in view of the desorption percentage and the adhering effect of the carbon black, polysiloxanes having methyl hydrogen siloxane units are preferred.

As the modified polysiloxanes (2-A), there may be used:

(a) polysiloxanes modified with polyethers represented by the formula (III):

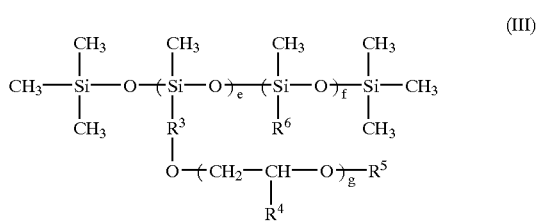

wherein $R^3$ is $-(-CH_2-)_h-$; $R^4$ is $-(-CH_2-)_i-CH_3$; $R^5$ is $-OH$, $-COOH$, $-CH=CH_2$, $-C(CH_3)=CH_2$ or $-(-CH_2-)_j-CH_3$; $R^6$ is $-(-CH_2-)_k-CH_3$; g and h are an integer of 1 to 15; i, j and k are an integer of 0 to 15; e is an integer of 1 to 50; and f is an integer of 1 to 300;

(b) polysiloxanes modified with polyesters represented by the formula (IV):

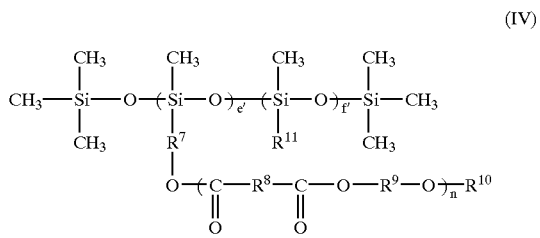

wherein $R^7$, $R^8$ and $R^9$ are $-(-CH_2-)_q-$ and may be the same or different; $R^{10}$ is $-OH$, $-COOH$, $-CH=CH_2$, $-C(CH_3)=CH_2$ or $-(-CH_2-)_r-CH_3$; $R^{11}$ is $-(-CH_2-)_s-CH_3$; n and q are an integer of 1 to 15; r and s are an integer of 0 to 15; e' is an integer of 1 to 50; and f' is an integer of 1 to 300;

(c) polysiloxanes modified with epoxy compounds represented by the formula (V):

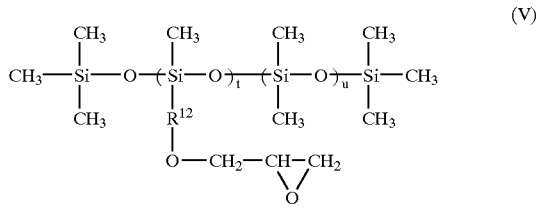

wherein $R^{12}$ is $-(-CH_2-)_v-$; v is an integer of 1 to 15; t is an integer of 1 to 50; and u is an integer of 1 to 300; or a mixture thereof.

Among these modified polysiloxanes (2-A), in view of the desorption percentage and the adhering effect of the carbon black, the polysiloxanes modified with the polyethers represented by the formula (III), are preferred.

As the terminal-modified polysiloxanes (2-B), there may be used those represented by the formula (VI):

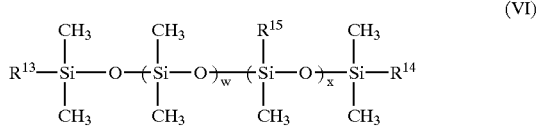

wherein $R^{13}$ and $R^{14}$ are $-OH$, $R^{16}OH$ or $R^{17}COOH$ and may be the same or different; $R^{15}$ is $-CH_3$ or —C$_6$H$_5$; R$^{16}$ and R$^{17}$ are —(—CH$_2$—)$_y$—; y is an integer of 1 to 15; w is an integer of 1 to 200; and x is an integer of 0 to 100.

Among these terminal-modified polysiloxanes, in view of the desorption percentage and the adhering effect of the carbon black, the polysiloxanes whose terminals are modified with carboxylic acid groups are preferred.

The coating amount of the organosilicon compounds is usually 0.02 to 5.0% by weight, preferably 0.03 to 4.0% by weight, more preferably 0.05 to 3.0% by weight (calculated as Si) based on the weight of the magnetic particles coated with the organosilicon compounds.

When the coating amount of the organosilicon compounds is less than 0.02% by weight, it may be difficult to adhere the carbon black in a predetermined.

When the coating amount of the organosilicon compounds is more than 5.0% by weight, the carbon black can be adhered in a predetermined. Therefore, it is unnecessary and meaningless to coat the magnetic particles with such a large amount of the organosilicon compounds.

The amount of the carbon black coat formed is usually 1 to 40 parts by weight, preferably 1 to 30 parts by weight based on 100 parts by weight of the magnetic particles as core particles.

When the amount of the carbon black coat formed is less than 1 part by weight, the amount of the carbon black may be insufficient, so that it may become difficult to obtain magnetic composite particles precursor (B) having a sufficient blackness.

On the other hand, when the amount of the carbon black coat formed is more than 40 parts by weight, the obtained magnetic composite particles precursor can show a sufficient blackness. However, since the amount of the carbon black is considerably large, the carbon black may tend to be desorbed from the coating layer composed of the organosilicon compound.

The thickness of carbon black coat formed is preferably not more than 0.04 μm, more preferably not more than 0.03 μm, still more preferably not more than 0.02 μm. The lower limit thereof is more preferably 0.0001 μm.

The carbon black may be adhered either over a whole surface of the coating layer composed of the alkoxysilane or polysiloxanes, or on at least a part of the surface of the coating layer so as to expose a part of the coating layer composed of the alkoxysilane or polysiloxanes to the outer surface of each magnetic composite particle precursor (B) so that a carbon black coat is formed on the surface of the coating layer. Even though a part of the coating layer composed of the alkoxysilane or polysiloxanes is exposed to the outer surface of each magnetic composite particle precursor, it is possible to suitably adhere the phthalocyanine-based pigments thereonto.

The particle shape and particle size of the magnetic composite particles precursor (B) used in the present invention are considerably varied depending upon those of the magnetic particles as core particles. The magnetic composite particles precursor has a similar particle shape to that of the magnetic particles as core particle, and a slightly larger particle size than that of the magnetic particles as core particles.

The desorption percentage of the carbon black from the magnetic composite particles precursor is preferably not more than 20% by weight, more preferably not more than 10% by weight (calculated as C).

In the magnetic composite particles precursor (B) used in the present invention, at least a part of the surface of the magnetic particles as core particles may be preliminarily coated with at least one compound selected from the group consisting of hydroxides of aluminum, oxides of aluminum, hydroxides of silicon and oxides of silicon (hereinafter referred to as "hydroxides and/or oxides of aluminum and/or silicon"), if necessary. In this case, the obtained magnetic composite particles precursor (B) having a coating layer composed of hydroxides and/or oxides of aluminum and/or silicon, can more effectively prevent the phthalocyanine-based pigments adhered thereonto from being desorbed therefrom as compared to the case where the magnetic composite particles precursor wherein the magnetic particles are uncoated with hydroxides and/or oxides of aluminum and/or silicon.

The amount of the hydroxides and/or oxides of aluminum and/or silicon coat is preferably 0.01 to 20% by weight (calculated as Al, SiO$_2$ or a sum of Al and SiO$_2$) based on the weight of the magnetic particles coated.

The particle size, geometrical standard deviation, BET specific surface area, blackness (L* value), a resin absorption, and magnetic properties of the magnetic composite particles precursor (B), wherein the surface of the magnetic particle is coated with the hydroxides and/or oxides of aluminum and/or silicon, are substantially the same as those of the magnetic composite particles precursor (B) wherein the magnetic particle is uncoated with the hydroxides and/or oxides of aluminum and/or silicon.

The desorption percentage of the phthalocyanine-based pigments can be reduced by forming the coating layer composed of hydroxides and/or oxides of aluminum and/or silicon thereon, and is preferably not more than 15%, more preferably not more than 10%.

The magnetic composite particles precursor (B) used in the present invention can be produced by the following method.

The coating of the magnetic particles with the alkoxysilane compounds, the polysiloxanes, the modified polysiloxanes or the terminal-modified polysiloxanes, may be conducted (i) by mechanically mixing and stirring the magnetic particles together with the alkoxysilane compounds, the polysiloxanes, the modified polysiloxanes or the terminal-modified polysiloxanes; or (ii) by mechanically mixing and stirring both the components together while spraying the alkoxysilane compounds, the polysiloxanes, the modified polysiloxanes or the terminal-modified polysiloxanes onto the magnetic particles. In these cases, substantially whole amount of the alkoxysilane compounds, the polysiloxanes, the modified polysiloxanes or the terminal-modified polysiloxanes added can be applied onto the surfaces of the magnetic particles.

In order to uniformly coat the surfaces of the magnetic particles with the alkoxysilane compounds, the polysiloxanes, the modified polysiloxanes or the terminal-modified polysiloxanes, it is preferred that the magnetic particles are preliminarily diaggregated by using a pulverizer.

As apparatus (a) for mixing and stirring the magnetic particles with the alkoxysilane compounds, the polysiloxanes, the modified polysiloxanes or the terminal-modified polysiloxanes to form the coating layer thereof, and (b) for mixing and stirring carbon black fine particles with the particles whose surfaces are coated with the alkoxysilane compounds, the polysiloxanes, the modified polysiloxanes or the terminal-modified polysiloxanes to form the carbon black coat, there may be preferably used those apparatus capable of applying a shear force to the particles, more preferably those apparatuses capable of conducting the application of shear force, spatulate-force and compressed-force at the same time. In addition, by conducting the above mixing or stirring treatment (a) of the core particles together with the alkoxysilane compounds, the polysiloxanes, the modified polysiloxanes or the terminal-modified polysiloxanes, at least a part of the alkoxysilane compounds coated on the magnetic particles may be changed to the organosilane compounds.

As such apparatuses, there may be exemplified wheel-type kneaders, ball-type kneaders, blade-type kneaders, roll-type kneaders or the like. Among them, wheel-type kneaders are preferred.

Specific examples of the wheel-type kneaders may include an edge runner (equal to a mix muller, a Simpson mill or a sand mill), a multi-mull, a Stotz mill, a wet pan mill, a Conner mill, a ring muller, or the like. Among them, an edge runner, a multi-mull, a Stotz mill, a wet pan mill and a ring muller are preferred, and an edge runner is more preferred.

Specific examples of the ball-type kneaders may include a vibrating mill or the like. Specific examples of the blade-type kneaders may include a Henschel mixer, a planetary mixer, a Nawter mixer or the like. Specific examples of the roll-type kneaders may include an extruder or the like.

In order to coat the surfaces of the magnetic particles with the alkoxysilane compounds, the polysiloxanes, the modified polysiloxanes or the terminal-modified polysiloxanes as uniformly as possible, the conditions of the above mixing or stirring treatment may be appropriately controlled such that the linear load is usually 19.6 to 1960 N/cm (2 to 200 Kg/cm), preferably 98 to 1470 N/cm (10 to 150 Kg/cm), more preferably 147 to 980 N/cm (15 to 100 Kg/cm); and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the alkoxysilane compounds, the polysiloxanes, the modified polysiloxanes or the terminal-modified polysiloxanes added, is preferably 0.15 to 45 parts by weight based on 100 parts by weight of the magnetic particles. When the amount of the alkoxysilane compounds, the polysiloxanes, the modified polysiloxanes or the terminal-modified polysiloxanes is added in an amount of 0.15 to 45 parts by weight, it is possible to adhere 1 to 30 parts by weight of the carbon black onto 100 parts by weight of the magnetic particles.

Next, the carbon black fine particles are added to the magnetic particles coated with the alkoxysilane compounds, the polysiloxanes, the modified polysiloxanes or the terminal-modified polysiloxanes, and the resultant mixture is mixed and stirred to form the carbon black coat on the surfaces of the coating composed of the alkoxysilane compounds, the polysiloxanes, the modified polysiloxanes or the terminal-modified polysiloxanes added. In addition, by conducting the above mixing or stirring treatment (b) of the carbon black fine particles together with the magnetic particles coated with the alkoxysilane compounds, the polysiloxanes or the modified polysiloxanes, the terminal-modified polysiloxanes, at least a part of the alkoxysilane compounds coated on the magnetic particles may be changed to the organosilane compounds.

In the case where the alkoxysilane compounds are used as the coating compound, after the carbon black coat is formed on the surface of the coating layer, the resultant composite particles may be dried or heat-treated, for example, at a temperature of usually 40 to 150° C., preferably 60 to 120° C. for usually 10 minutes to 12 hours, preferably 30 minutes to 3 hours, thereby forming a coating layer composed of the organosilane compounds (1).

By varying an adding method of the carbon black fine particles, mixing and stirring conditions, it is possible to form the carbon black coat on the coating layer composed of the organosilicon compounds, thereby rendering the coating process industrially disadvantageous.

As the adding method, a lump addition method, a continuous addition method, a divided addition method may be exemplified. When a large amount of the carbon black fine particles is added, it is preferred to conduct the continuous addition method and the divided addition method.

In case of continuously adding the carbon black fine particles, the carbon black fine particles may be added slowly and little by little, especially for a period of 5 minutes to 24 hours, preferably 5 minutes to 20 hours. The mixing and stirring step under the following conditions can be conducted.

In case of dividedly adding the carbon black fine particles, the adding step of the carbon black fine particles of 5 to 25 parts by weight based on 100 parts by weight of the magnetic particles. The mixing and stirring step under the following conditions can be repeated until the added amount of the carbon black fine particles reaches a predetermined amount thereof.

The mixing and stirring conditions may be appropriately selected so as to form a uniform carbon black coat on the coating layer composed of the organosilicon compounds, and may be controlled such that the linear load is usually 19.6 to 1,960 N/cm (2 to 200 kg/cm), preferably 98 to 1,470 N/cm (10 to 150 kg/cm), more preferably 147 to 980 N/cm (15 to 100 kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

Although carbon black can be adhered in an amount of more than 30 parts by weight based on 100 parts by weight of the magnetic particles by prolonging the mixing and stirring time, such a procedure is disadvantageous from industrial viewpoints because a too long mixing and stirring time is required. In the consideration of good industrial productivity, there is preferably used the method of adding alkoxysilanes or polysiloxanes to the magnetic composite particles precursor having the first carbon black coat adhered onto the surface of magnetic particles through alkoxysilanes or polysiloxanes; mixing and stirring the resultant mixture to coat the magnetic composite particles precursor with the alkoxysilanes or polysiloxanes; further adding fine carbon black particles to the thus coated particles; and mixing and stirring the resultant mixture to adhere the second carbon black coat onto the first carbon black coat through the alkoxysilanes or polysiloxanes.

The amount of the carbon black fine particles added, is usually 1 to 40 parts by weight, preferably 1 to 30 parts by weight based on 100 parts by weight of the magnetic particles. When the amount of the carbon black fine particles added is less than 1 part by weight, it may become difficult to form the carbon black coat in such an amount enough to improve the blackness of the obtained magnetic composite particles precursor. On the other hand, when the amount of the carbon black fine particles added is more than 40 parts by weight, a sufficient blackness of the resultant magnetic composite particles precursor can be obtained, but the carbon black tend to be desorbed from the surface of the coating layer because of too large amount of the carbon black adhered, so that it may become difficult to uniformly coat the surface of the magnetic composite particles precursor with the alkoxysilanes or polysiloxanes, and uniformly adhere the phthalocyanine-based pigments on the surface of the coating layer comprising the alkoxysilanes or polysiloxanes.

Alternatively, at least a part of the surface of the magnetic particles may be coated with at least one compound selected from the group consisting of hydroxides of aluminum, oxides of aluminum, hydroxides of silicon and oxides of silicon, if required.

The coat of the hydroxides and/or oxides of aluminum and/or silicon may be conducted by adding an aluminum compound, a silicon compound or both the compounds to a water suspension in which the magnetic particles are dispersed, followed by mixing and stirring, and further adjusting the pH value of the suspension, if required, thereby coating the surfaces of the magnetic particles with at least one compound selected from the group consisting of hydroxides of aluminum, oxides of aluminum, hydroxides of silicon and oxides of silicon. The thus obtained magnetic particles coated with the hydroxides and/or oxides of aluminum and/or silicon are then filtered out, washed with water, dried and pulverized. Further, the magnetic particles coated with the hydroxides and/or oxides of aluminum and/or silicon may be subjected to post-treatments such as deaeration treatment and compaction treatment, if required.

As the aluminum compounds, there may be exemplified aluminum salts such as aluminum acetate, aluminum sulfate, aluminum chloride or aluminum nitrate, alkali aluminates such as sodium aluminate or the like.

The amount of the aluminum compound added is 0.01 to 20% by weight (calculated as Al) based on the weight of the magnetic particles.

As the silicon compounds, there may be exemplified water glass #3, sodium orthosilicate, sodium metasilicate or the like.

The amount of the silicon compound added is 0.01 to 20% by weight (calculated as $SiO_2$) based on the weight of the magnetic particles.

In the case where both the aluminum and silicon compounds are used in combination for the coating, the total amount of the aluminum and silicon compounds added is preferably 0.01 to 20% by weight (calculated as a sum of Al and $SiO_2$) based on the weight of the magnetic particles.

Next, the coating layer formed on the surface of the magnetic particle or on the said carbon black coat of the magnetic composite particles precursor (B), comprising the organosilicon compound selected from the group consisting of: (1) organosilane compounds obtainable from alkoxysilane compounds, and (2) polysiloxanes or modified polysiloxanes, is explained.

The organosilane compounds (1) may be produced from alkoxysilane compounds represented by the formula (I):

wherein $R^1$ is $C_6H_5-$, $(CH_3)_2CHCH_2-$ or $n-C_bH_{2b+1}-$ (wherein b is an integer of 1 to 18); X is $CH_3O-$ or $C_2H_5O-$; and a is an integer of 0 to 3.

The drying or heat-treatment of the alkoxysilane compounds may be conducted, for example, at a temperature of usually 40 to 150° C., preferably 60 to 120° C. for usually 10 minutes to 12 hours, preferably 30 minutes to 3 hours.

Specific examples of the alkoxysilane compounds may include methyltriethoxysilane, dimethyldiethoxysilane, phenyltriethyoxysilane, diphenyldiethoxysilane, methyltrimethoxysilane, dimethyldimethoxysilane, phenyltrimethoxysilane, diphenyldimethoxysilane, isobutyltrimethoxysilane, decyltrimethoxysilane or the like. Among these alkoxysilane compounds, in view of the desorption percentage and the adhering effect of the phthalocyanine-based pigments, methyltriethoxysilane, phenyltriethyoxysilane, methyltrimethoxysilane, dimethyldimethoxysilane and isobutyltrimethoxysilane are preferred, and methyltriethoxysilane, methyltrimethoxysilane and phenyltriethyoxysilane are more preferred.

As the polysiloxanes (2), there may be used those compounds represented by the formula (II):

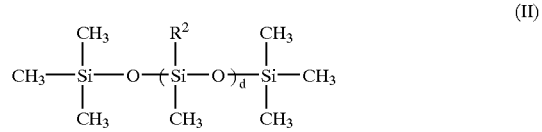

wherein $R^2$ is H— or $CH_3-$, and d is an integer of 15 to 450.

Among these polysiloxanes, in view of the desorption percentage and the adhering effect of the phthalocyanine-based pigments, polysiloxanes having methyl hydrogen siloxane units are preferred.

As the modified polysiloxanes (2-A), there may be used:

(a) polysiloxanes modified with polyethers represented by the formula (III):

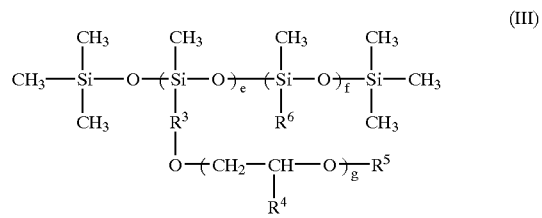

wherein $R^3$ is $-(-CH_2-)_h-$; $R^4$ is $-(-CH_2-)_i-CH_3$; $R^5$ is $-OH$, $-COOH$, $-CH=CH_2$, $-C(CH_3)=CH_2$ or $-(-CH_2-)_j-CH_3$; $R^6$ is $-(-CH_2-)_k-CH_3$; g and h are an integer of 1 to 15; i, j and k are an integer of 0 to 15; e is an integer of 1 to 50; and f is an integer of 1 to 300;

(b) polysiloxanes modified with polyesters represented by the formula (IV):

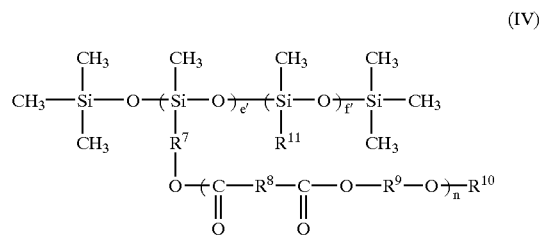

wherein $R^7$, $R^8$ and $R^9$ are $-(-CH_2-)_q-$ and may be the same or different; $R^{10}$ is $-OH$, $-COOH$, $-CH=CH_2$, $-C(CH_3)=CH_2$ or $-(-CH_2-)_r-CH_3$; $R^{11}$ is $-(-CH_2-)_s-CH_3$; n and q are an integer of 1 to 15; r and s are an integer of 0 to 15; e' is an integer of 1 to 50; and f' is an integer of 1 to 300;

(c) polysiloxanes modified with epoxy compounds represented by the formula (V):

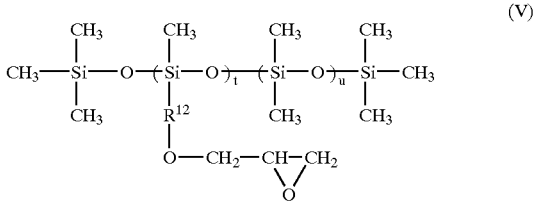

(V)

wherein $R^{12}$ is $-(-CH_2-)_v-$; v is an integer of 1 to 15; t is an integer of 1 to 50; and u is an integer of 1 to 300; or a mixture thereof.

Among these modified polysiloxanes (2-A), in view of the desorption percentage and the adhering effect of the phthalocyanine-based pigments, the polysiloxanes modified with the polyethers represented by the formula (III), are preferred.

As the terminal-modified polysiloxanes (2-B), there may be used those represented by the formula (VI):

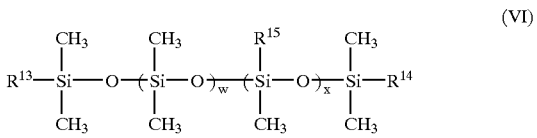

(VI)

wherein $R^{13}$ and $R^{14}$ are —OH, $R^{16}OH$ or $R^{17}COOH$ and may be the same or different; $R^{15}$ is —$CH_3$ or —$C_6H_5$; $R^{16}$ and $R^{17}$ are $-(-CH_2-)_y-$; y is an integer of 1 to 15; w is an integer of 1 to 200; and x is an integer of 0 to 100.

Among these terminal-modified polysiloxanes, in view of the desorption percentage and the adhering effect of the phthalocyanine-based pigments, the polysiloxanes whose terminals are modified with carboxylic acid groups are preferred.

The coating amount of the organosilicon compounds is usually 0.02 to 5.0% by weight, preferably 0.03 to 4.0% by weight, more preferably 0.05 to 3.0% by weight (calculated as Si) based on the weight of the magnetic core particles coated with the organosilicon compounds.

When the coating amount of the organosilicon compounds is less than 0.02% by weight, it may be difficult to adhere the phthalocyanine-based pigments in a predetermined.

When the coating amount of the organosilicon compounds is more than 5.0% by weight, the phthalocyanine-based pigments can be adhered in a predetermined. Therefore, it is unnecessary and meaningless to coat the magnetic core particles with such a large amount of the organosilicon compounds.

As the phthalocyanine-based pigments used in the present invention, there may be used organic blue-based pigments such as metal-free phthalocyanine blue, phthalocyanine blue (copper phthalocyanine) and fast sky blue (sulfonated copper phthalocyanine) and organic green-based pigments such as phthalocyanine green, or the like. In the consideration of the blackness of the obtained magnetic composite particles, among these pigments, it is preferred to use of organic blue-based pigments, more preferably phthalocyanine blue.

The amount of the phthalocyanine-based pigments adhered is usually 1 to 100 parts by weight, preferably 1.5 to 90 parts by weight, more preferably 2 to 80 parts by weight based on 100 parts by weight of the magnetic particles.

When the amount of the phthalocyanine-based pigments adhered is less than 1 part by weight, it may be difficult to obtain magnetic composite particles having sufficient blackness and resin adsorptivity because of the insufficient amount of the phthalocyanine-based pigments adhered.

When the amount of the phthalocyanine-based pigment adhered is more than 100 parts by weight, although the obtained magnetic composite particles can show a sufficient resin adsorptivity, the phthalocyanine-based pigment may tend to desorbed therefrom because the amount of the phthalocyanine-based pigment adhered is too large. As a result, the obtained magnetic composite particles may tend to be deteriorated in dispersibility in vehicle upon the production of a magnetic coating composition.

The particle shape and particle size of the magnetic composite particles according to the present invention are considerably varied depending upon those of the magnetic particles as core particles. Specifically, the magnetic composite particles are substantially similar in particle shape to that of the core particles, and have a slightly larger particle size than that of the core particles.

In case of using the acicular magnetic particles as the core particles, the average major axis diameter of the magnetic composite particles according to the present invention is usually 0.02 to 0.70 μm, preferably 0.03 to 0.60 μm, more preferably 0.04 to 0.50 μm. The aspect ratio (average major axis diameter/average minor axis diameter) of the magnetic composite particles according to the present invention is usually 2.0:1 to 20.0:1, preferably 2.5:1 to 18.0:1, more preferably 3.0:1 to 15.0:1.

When the average major axis diameter thereof is more than 0.70 μm, since the magnetic composite particles are coarse, the surface smoothness of the magnetic recording layer formed using such particles may be impaired. On the other hand, when the average major axis diameter of the magnetic composite particles is less than 0.02 μm, the intermolecular force between the particles may be increased due to the fineness thereof, so that it may become difficult to uniformly disperse the particles in a vehicle.

When the aspect ratio is more than 20.0:1, the particles may be entangled with each other in vehicle, thereby causing a tendency that the dispersibility thereof may be deteriorated or the viscosity thereof may be increased. On the other hand, when the aspect ratio is less than 2.0:1, it may be difficult to obtain a coating film having a sufficient strength.

In case of using the plate-shaped magnetic particles as the core particles, the average plate surface diameter of the magnetic composite particles according to the present invention is preferably 0.02 to 0.20 μm, more preferably 0.025 to 0.20 μm, still more preferably 0.03 to 0.20 μm. The plate ratio (average plate surface diameter/average thickness) of the magnetic composite particles according to the present invention is usually 2.0:1 to 20.0:1, preferably 2.5:1 to 18.0:1, more preferably 3.0:1 to 15.0:1.

When the average plate surface diameter thereof is more than 0.20 μm, since the magnetic composite particles may tend to become coarse, the surface smoothness of the magnetic recording layer formed using such particles may be impaired. On the other hand, when the average plate surface diameter of the magnetic composite particles is less than 0.02 μm, the intermolecular force between the particles may be increased due to the fineness thereof, so that it may become difficult to uniformly disperse the particles in a vehicle.

When the plate ratio is more than 20.0:1, the particles may be stacked up each other, thereby causing a tendency that the dispersibility thereof may be deteriorated or the viscosity thereof may be increased. On the other hand, when the plate ratio is less than 2.0:1, it may be difficult to obtain a coating film having a sufficient strength.

Further, it is preferred that the magnetic composite particles according to the present invention have a geometrical standard deviation of particle diameter of not more than 2.0. When the geometrical standard deviation of particle diameter is more than 2.0, since coarse particles tend to be present in the magnetic composite particles, the surface smoothness of the coating film formed using such particles may be impaired. With the consideration of the surface smoothness, the geometrical standard deviation of particle diameter of the magnetic composite particles according to the present invention is preferably not more than 1.9, more preferably not more than 1.8. Further, in view of industrial production of the magnetic composite particles, the lower limit of the geometrical standard deviation of the particle diameter is preferably 1.01.

The BET specific surface area of the magnetic composite particles according to the present invention is usually 15 to 200 m$^2$/g, preferably 20 to 150 m$^2$/g, more preferably 25 to 100 m$^2$/g.

If the BET specific surface area thereof is more than 200 m$^2$/g, the increase of the intermolecular force due to the fine particles. As a result, it may be difficult to uniformly disperse the particles in a vehicle. On the other hand, if the BET specific surface area thereof is less than 15 m$^2$/g, the magnetic particles may be coarse particles or large particles produced by sintering a particle and between particles, which are apt to exert a deleterious influence on the surface smoothness of the coating film formed using such particles.

As to the blackness of the magnetic composite particles of the present invention, the lower limit of L* value thereof is usually 16.5, and the upper limit thereof is usually 24.0, preferably 23.0, more preferably 22.0. When the L* value is more than 24.0, the lightness of the obtained magnetic composite particles is too high, thereby failing to exhibit an excellent blackness.

As to the blackness of the magnetic composite particles obtained by using magnetic composite particles precursor (B) as core particles, the lower limit of L* value thereof is usually 14.5, and the upper limit of L* value thereof is usually 21.0, preferably 20.5, more preferably 20.0.

The percentage of desorption of the phthalocyanine-based pigments from the magnetic composite particles according to the present invention is usually not more than 20%, preferably not more than 15%. When the desorption percentage of the phthalocyanine-based pigments is more than 20%, the desorbed the phthalocyanine-based pigments tend to inhibit the magnetic composite particles from being uniformly dispersed in a vehicle upon the production of magnetic coating composition.

The resin adsorptivity of the magnetic composite particles according to the present invention is usually not less than usually 70%, preferably not less than 72%, more preferably not less than 74W. The upper limit thereof is preferably 95%.

As to the magnetic properties of the magnetic composite particles, the coercive force is usually 39.8 to 318.3 kA/m (500 to 4000 Oe), preferably 43.8 to 318.3 kA/m (550 to 4000 Oe), and the saturation magnetization is usually 35 to 170 Am$^2$/kg (35 to 170 emu/g), preferably 40 to 170 Am$^2$/kg (40 to 170 emu/g).

As to the magnetic properties of the magnetic composite particles produced by using the Co-coated magnetic iron oxide particles as core particles, the coercive force is usually 39.9 to 135.3 kA/m (500 to 1700 Oe), preferably 43.8 to 135.3 kA/m (550 to 1700 Oe), and the saturation magnetization is usually 60 to 90 Am$^2$/kg (60 to 90 emu/g), preferably 65 to 90 Am$^2$/kg (65 to 90 emu/g).

As to the magnetic properties of the magnetic composite particles produced by using the magnetic acicular metal particles containing iron as a main component or magnetic acicular iron-based alloy particles as core particles, the coercive force is usually 63.7 to 278.5 kA/m (800 to 3500 Oe), preferably 71.6 to 278.5 kA/m (900 to 3500 Oe), and the saturation magnetization is usually 90 to 170 Am$^2$/kg (90 to 170 emu/g), preferably 100 to 170 Am$^2$/kg (100 to 170 emu/g).

As to the magnetic properties of the magnetic composite particles produced by using the plate-shaped magnetoplumbite-type ferrite particles as core particles, the coercive force is usually 39.8 to 318.3 kA/m (500 to 4000 Oe), preferably 51.7 to 318.3 kA/m (650 to 4000 Oe), and the saturation magnetization is usually 35 to 70 Am$^2$/kg (35 to 70 emu/g), preferably 40 to 70 Am$^2$/kg (40 to 70 emu/g).

In the magnetic composite particles according to the present invention, the magnetic particle as core particle may be preliminarily coated with at least one compound selected from the group consisting of hydroxides of aluminum, oxides of aluminum, hydroxides of silicon and oxides of silicon (hereinafter referred to as "hydroxides and/or oxides of aluminum and/or silicon"), if required. The obtained magnetic particles having a coating layer composed of hydroxides and/or oxides of aluminum and/or silicon can more effectively prevent the phthalocyanine-based pigments adhered thereonto from being desorbed therefrom as compared to the case where the magnetic particles are uncoated with hydroxides and/or oxides of aluminum and/or silicon.

The amount of the coating layer composed of hydroxides and/or oxides of aluminum and/or silicon is preferably 0.01 to 20% by weight (calculated as Al, SiO$_2$ or a sum of Al and SiO$_2$) based on the weight of the magnetic particles coated.

When the amount of the coating layer composed of hydroxides and/or oxides of aluminum and/or silicon is less than 0.01% by weight, the effect of preventing the desorption of the phthalocyanine-based pigments may not be obtained. When the amount of the coating layer composed of hydroxides and/or oxides of aluminum and/or silicon falls within the above-specified range of 0.01 to 20% by weight, the effect of preventing the desorption of the phthalocyanine-based pigments can be sufficiently exhibited. Therefore, it is unnecessary and meaningless to form the coating layer composed of hydroxides and/or oxides of aluminum and/or silicon in such a large amount exceeding 20% by weight.

The particle size, geometrical standard deviation value, BET specific surface area value, magnetic properties, resin adsorptivity and L* value of the magnetic composite particles comprising the magnetic particles having the coating layer composed of hydroxides and/or oxides of aluminum and/or silicon, are substantially the same as those of the magnetic composite particles comprising the magnetic particles uncoated with the hydroxides and/or oxides of aluminum and/or silicon. The desorption percentage of the phthalocyanine-based pigments from the magnetic composite particles can be reduced by forming the coating layer composed of hydroxides and/or oxides of aluminum and/or silicon on each magnetic composite particle, and is preferably not more than 15%, more preferably not more than 10%.

Next, the magnetic recording medium according to the present invention is described.

The magnetic recording medium according to the present invention is constituted by a non-magnetic base film, and a magnetic coating film formed on the non-magnetic base film, comprising a binder resin and magnetic composite particles.

As the non-magnetic base film, the following materials which are at present generally used for the production of a magnetic recording medium are usable as a raw material: a synthetic resin such as polyethylene terephthalate, polyethylene, polypropylene, polycarbonate, polyethylene naphthalate, polyamide, polyamideimide and polyimide; foil and plate of a metal such as aluminum and stainless steel; and various kinds of paper. The thickness of the non-magnetic base film varies depending upon the material, but it is usually about 1.0 to 300 μm, preferably 2.0 to 200 μm.

In the case of a magnetic disc, polyethylene terephthalate is usually used as the non-magnetic base film. The thickness thereof is usually 50 to 300 μm, preferably 60 to 200 μm. In the case of a magnetic tape, when polyethylene terephthalate is used as the base film, the thickness thereof is usually 3 to 100 μm, preferably 4 to 20 μm. When polyethylene naphthalate is used, the thickness thereof is usually 3 to 50 μm, preferably 4 to 20 μm. When polyamide is used, the thickness thereof is usually 2 to 10 μm, preferably 3 to 7 μm.

As the binder resin used in the present invention, the following resins which are at present generally used for the production of a magnetic recording medium are usable: vinyl chloride-vinyl acetate copolymer, urethane resin, vinyl chloride-vinyl acetate-maleic acid copolymer, urethane elastomer, butadiene-acrylonitrile copolymer, polyvinyl butyral, cellulose derivative such as nitrocellulose, polyester resin, synthetic rubber resin such as polybutadiene, epoxy resin, polyamide resin, polyisocyanate, electron radiation curing acryl urethane resin and mixtures thereof.

Each of these resin binders may contain a functional group such as —OH, —COOH, —SO$_3$M, —OPO$_2$M$_2$ and —NH$_2$, wherein M represents H, Na or K. With the consideration of the dispersibility of the particles, a binder resin containing a functional group —COOH or —SO$_3$M is preferable.

The thickness of the magnetic recording layer obtained by applying the magnetic coating composition on the surface of the non-magnetic base film and dried, is usually in the range of 0.01 to 5.0 μm, preferably 0.05 to 4.0 μm. If the thickness is less than 0.01 μm, uniform coating may be difficult, so that unfavorable phenomenon such as unevenness on the coating surface is observed. On the other hand, when the thickness exceeds 5.0 μm, it may be difficult to obtain desired electromagnetic performance due to an influence of diamagnetism.

The mixing ratio of the magnetic composite particles with the binder resin is usually 5 to 2000 parts by weight, preferably 100 to 1000 parts by weight based on 100 parts by weight of the binder resin.

When the amount of the magnetic composite particles blended is less than 5 parts by weight, the amount of the magnetic composite particles contained in the magnetic coating composition is too small. As a result, there may not be formed a coating film in which the magnetic composite particles are continuously dispersed, and the surface smoothness of the coating film and the strength of the magnetic substrate may become insufficient. When the amount of the magnetic composite particles blended is more than 2,000 parts by weight, the amount of the magnetic composite particles becomes too large as compared to that of the binder resin, thereby failing to sufficiently disperse the magnetic composite particles in the magnetic coating composition. As a result, it may be difficult to form a coating film having a sufficiently smooth surface. Further, the magnetic composite particles may not be sufficiently bound together by the binder resin, so that the obtained coating film becomes brittle.

A lubricant, a polishing agent, an antistatic agent, etc. which are generally used for the production of a magnetic recording medium may be added to the magnetic recording layer in amount of usually 0.1 to 50 parts by weight based on 100 parts by weight of the binder resin.

The magnetic recording medium according to the present invention has the following properties.

The magnetic recording medium according to the present invention has a coercive force of usually 39.8 to 318.3 kA/m (500 to 4000 Oe); a squareness (residual magnetic flux density Br/saturation magnetic flux density Bm) of usually 0.82 to 0.95; a gloss (of the coating film) of usually 165 to 300%; a surface roughness Ra (of the coating film) of usually not more than 11.0 nm; a Young's modulus (relative value to a commercially available video tape: AV T-120 produced by Victor Company of Japan, Limited) of usually 125 to 160; a linear adsorption coefficient (of the coating film) of usually 1.20 to 5.0 μm$^{-1}$. As to the durability of the above magnetic recording medium, the running durability time thereof is usually not less than 21 minutes; and the scratch resistance thereof is usually rank A or B.

In case where the magnetic composite particles produced by using as core particles magnetic Co-coated acicular iron oxide particles which are not coated with hydroxides and/or oxides of aluminum and/or silicon, are used as magnetic particles, the magnetic recording medium according to the present invention has a coercive force of usually 39.8 to 135.3 kA/m (500 to 1700 Oe), preferably 43.8 to 135.3 kA/m (550 to 1700 Oe); a squareness (residual magnetic flux density Br/saturation magnetic flux density Bm) of usually 0.85 to 0.95, preferably 0.86 to 0.95; a gloss (of the coating film) of usually 165 to 300%, preferably 170 to 300%; a surface roughness Ra (of the coating film) of usually not more than 11.0 nm, preferably 2.0 to 10.5 nm, more preferably 2.0 to 10.0 nm; a Young's modulus (relative value to a commercially available video tape: AV T-120 produced by Victor Company of Japan, Limited) of usually 125 to 160, preferably 126 to 160; a linear adsorption coefficient (of the coating film) of usually 1.20 to 5.0 μm$^{-1}$, preferably 1.25 to 5.0 μm$^{-1}$. As to the durability of the above magnetic recording medium, the running durability time thereof is usually not less than 21 minutes, preferably not less than 22 minutes; and the scratch resistance thereof is usually rank A or B, preferably A.

In case where the magnetic composite particles produced by using as core particles magnetic acicular metal particles containing iron as a main component or magnetic acicular iron-based alloy particles which are not coated with hydroxides and/or oxides of aluminum and/or silicon, are used as magnetic particles, the magnetic recording medium according to the present invention has a coercive force of usually 63.7 to 278.5 kA/m (800 to 3500 Oe), preferably 71.6 to 278.5 kA/m (900 to 3500 Oe); a squareness (residual magnetic flux density Br/saturation magnetic flux density Bm) of usually 0.85 to 0.95, preferably 0.86 to 0.95; a gloss (of the coating film) of usually 185 to 300%, preferably 190 to 300%; a surface roughness Ra (of the coating film) of usually not more than 11.0 nm, preferably 2.0 to 10.5 nm, more preferably 2.0 to 10.0 nm; a Young's modulus (relative value to a commercially available video tape: AV T-120 produced by Victor Company of Japan, Limited) of usually 125 to 160, preferably 126 to 160; a linear adsorption coefficient (of the coating film) of usually 1.30 to 5.0 μm$^{-1}$, preferably 1.35 to 5.0 μm$^{-1}$. As to the durability of the above magnetic recording medium, the running durability time thereof is usually not less than 22 minutes, preferably not less than 23 minutes; and the scratch resistance thereof is usually rank A or B, preferably A.

In case where the magnetic composite particles produced by using as core particles magnetic plate-shaped particles which are not coated with hydroxides and/or oxides of aluminum and/or silicon, are used as magnetic particles, the magnetic recording medium according to the present invention has a coercive force of usually 39.8 to 318.3 kA/m (500 to 4000 Oe), preferably 51.7 to 318.3 kA/m (650 to 4000 Oe); a squareness (residual magnetic flux density Br/saturation magnetic flux density Bm) of usually 0.82 to 0.95, preferably 0.83 to 0.95; a gloss (of the coating film) of usually 170 to 300%, preferably 175 to 300%; a surface roughness Ra (of the coating film) of usually not more than 11.0 nm, preferably 2.0 to 10.5 nm, more preferably 2.0 to 10.0 nm; a Young's modulus (relative value to a commercially available video tape: AV T-120 produced by Victor Company of Japan, Limited) of usually 125 to 160, preferably 126 to 160; a linear adsorption coefficient (of the coating film) of usually 1.20 to 5.0 $\mu m^{-1}$, preferably 1.25 to 5.0 $\mu m^{-1}$. As to the durability of the above magnetic recording medium, the running durability time thereof is usually not less than 22 minutes, preferably not less than 23 minutes; and the scratch resistance thereof is usually rank A or B, preferably A.

In case where the magnetic composite particles produced by using as core particles magnetic Co-coated acicular iron oxide particles which are coated with hydroxides and/or oxides of aluminum and/or silicon, are used as magnetic particles, the magnetic recording medium according to the present invention has a coercive force of usually 39.8 to 135.3 kA/m (500 to 1700 Oe), preferably 43.8 to 135.3 kA/m (550 to 1700 Oe); a squareness (residual magnetic flux density Br/saturation magnetic flux density Bm) of usually 0.85 to 0.95, preferably 0.86 to 0.95; a gloss (of the coating film) of usually 170 to 300%, preferably 175 to 300%; a surface roughness Ra (of the coating film) of usually not more than 10.0 nm, preferably 2.0 to 9.5 nm, more preferably 2.0 to 9.0 nm; a Young's modulus (relative value to a commercially available video tape: AV T-120 produced by Victor Company of Japan, Limited) of usually 127 to 160, preferably 128 to 160; a linear adsorption coefficient (of the coating film) of usually 1.20 to 5.0 $\mu m^{-1}$, preferably 1.25 to 5.0 $\mu m^{-1}$. As to the durability of the above magnetic recording medium, the running durability time thereof is usually not less than 22 minutes, preferably not less than 23 minutes; and the scratch resistance thereof is usually rank A or B, preferably A.

In case where the magnetic composite particles produced by using as core particles magnetic acicular metal particles containing iron as a main component or magnetic acicular iron-based alloy particles which are coated with hydroxides and/or oxides of aluminum and/or silicon, are used as magnetic particles, the magnetic recording medium according to the present invention has a coercive force of usually 63.7 to 278.5 kA/m (800 to 3500 Oe), preferably 71.6 to 278.5 kA/m (900 to 3500 Oe); a squareness (residual magnetic flux density Br/saturation magnetic flux density Bm) of usually 0.85 to 0.95, preferably 0.86 to 0.95; a gloss (of the coating film) of usually 190 to 300%, preferably 195 to 300%; a surface roughness Ra (of the coating film) of usually not more than 10.0 nm, preferably 2.0 to 9.5 nm, more preferably 2.0 to 9.0 nm; a Young's modulus (relative value to a commercially available video tape: AV T-120 produced by Victor Company of Japan, Limited) of usually 127 to 160, preferably 128 to 160; a linear adsorption coefficient (of the coating film) of usually 1.30 to 5.0 $\mu m^{-1}$, preferably 1.35 to 5.0 $m^{-1}$. As to the durability of the above magnetic recording medium, the running durability time thereof is usually not less than 23 minutes, preferably not less than 24 minutes; and the scratch resistance thereof is usually rank A or B, preferably A.

In case where the magnetic composite particles produced by using as core particles magnetic plate-shaped particles which are coated with hydroxides and/or oxides of aluminum and/or silicon, are used as magnetic particles, the magnetic recording medium according to the present invention has a coercive force of usually 39.8 to 318.3 kA/m (500 to 4000 Oe), preferably 51.7 to 318.3 kA/m (650 to 4000 Oe); a squareness (residual magnetic flux density Br/saturation magnetic flux density Bm) of usually 0.82 to 0.95, preferably 0.83 to 0.95; a gloss (of the coating film) of usually 175 to 300%, preferably 180 to 300%; a surface roughness Ra (of the coating film) of usually not more than 10.5 nm, preferably 2.0 to 10.0 nm, more preferably 2.0 to 9.5 nm; a Young's modulus (relative value to a commercially available video tape: AV T-120 produced by Victor Company of Japan, Limited) of usually 126 to 160, preferably 127 to 160; a linear adsorption coefficient (of the coating film) of usually 1.20 to 5.0 $\mu m^{-1}$, preferably 1.25 to 5.0 $\mu m^{-1}$. As to the durability of the above magnetic recording medium, the running durability time thereof is usually not less than 23 minutes, preferably not less than 24 minutes; and the scratch resistance thereof is usually rank A or B, preferably A.

A non-magnetic undercoat layer comprising a binder resin and the non-magnetic particles, may be disposed between the non-magnetic base film and the magnetic recording layer.

As the non-magnetic particles for the non-magnetic undercoat layer, there may be used non-magnetic inorganic particles incorporated into a non-magnetic undercoat layer of ordinary magnetic recording media. Specific examples of the non-magnetic particles may include hematite particles, iron oxide hydroxide particles, titanium oxide particles, zinc oxide particles, tin oxide particles, tungsten oxide particles, silicon dioxide particles, α-alumina particles, β-alumina particles, γ-alumina particles, chromium oxide particles, cerium oxide particles, silicon carbide particles, titanium carbide particles, silicon nitride particles, boron nitride particles, calcium carbonate particles, barium carbonate particles, magnesium carbonate particles, strontium carbonate particles, calcium sulfate particles, barium sulfate particles, molybdenum disulfide particles, barium titanate particles or the like. These non-magnetic particles may be used alone or in combination of any two or more thereof. Among these non-magnetic particles, hematite particles, iron oxide hydroxide particles and titanium oxide particles, etc., are preferred.

Upon the production of a non-magnetic coating composition, the surface of the non-magnetic particles may be coated, if required, with at least one selected from the group consisting of hydroxides of aluminum, oxides of aluminum, hydroxides of silicon, oxides of silicon or the like in order to improve a dispersibility in vehicles. In addition, in order to improve various properties of the obtained magnetic recording media such as light transmittance, surface resistivity, mechanical strength, surface smoothness, durability and the like, various elements such as Al, Ti, Zr, Mn, Sn, Sb, etc., may be incorporated into the non-magnetic particles according to requirements.

The non-magnetic particles may have various shapes, and may include, for example, granular particles such as spherical particles, granular particles, octahedral particles, hexahedral particles and polyhedral particles; acicular particles such as needle-shaped particles, spindle-shaped particles and rice ball-shaped particles; plate-shaped particles; or the like. In the consideration of good surface smoothness of the obtained magnetic recording media, the use of acicular non-magnetic particles is preferred.

The non-magnetic particles of a granular shape have an average particle diameter of usually 0.01 to 0.3 μm, preferably 0.015 to 0.25 μm, more preferably 0.02 to 0.2 μm. The non-magnetic particles of an acicular shape have an average major axis diameter of usually 0.01 to 0.3 μm, preferably 0.015 to 0.25 μm, more preferably 0.02 to 0.2 μm. The non-magnetic particles of a plate shape have an average plate surface diameter of usually 0.01 to 0.3 μm, preferably 0.015 to 0.25 μm, more preferably 0.02 to 0.2 μm.

The acicular non-magnetic particles have an aspect ratio of usually 2:1 to 20:1, preferably 2.5:1 to 15:1, more preferably 3:1 to 10:1; and the plate-shaped non-magnetic particles have a plate ratio of usually 2:1 to 50:1, preferably 2.5:1 to 20:1, more preferably 3:1 to 10:1.

The non-magnetic undercoat layer of the present invention has a film thickness of preferably 0.2 to 10.0 μm. When the thickness of the non-magnetic undercoat layer is less than 0.2 μm, it may be difficult to improve the surface roughness of the non-magnetic substrate (composed of the non-magnetic base film and the non-magnetic undercoat layer). In the consideration of reduction in thickness of the obtained magnetic recording medium and surface smoothness of the non-magnetic undercoat layer, the thickness of the non-magnetic undercoat layer is more preferably in the range of 0.5 to 5.0 μm.

As the binder resin for the non-magnetic undercoat layer, the same binder resin as that used for the production of the magnetic recording layer is usable.

The mixing ratio of the non-magnetic particles with the binder resin is usually 5 to 2000 parts by weight, preferably 100 to 1000 parts by weight based on 100 parts by weight of the binder resin.

When the amount of the non-magnetic particles blended is less than 5 parts by weight, the amount of the non-magnetic particles contained in the non-magnetic coating composition may be too small. As a result, there may not be formed a coating film in which the non-magnetic particles are continuously dispersed, and the surface smoothness of the coating film may become insufficient. When the amount of the non-magnetic particles blended is more than 2,000 parts by weight, the amount of the non-magnetic particles may become too large as compared to that of the binder resin, thereby failing to sufficiently disperse the non-magnetic particles in the coating composition. As a result, it may be difficult to form a non-magnetic undercoat layer having a sufficiently smooth surface. Further, the non-magnetic particles may not be sufficiently bound together by the binder resin, so that the obtained coating film may become brittle.

A lubricant, a polishing agent, an antistatic agent, etc. which are generally used for the production of a magnetic recording medium may be added to the non-magnetic undercoat layer in amount of usually 0.1 to 50 parts by weight based on 100 parts by weight of the binder resin.

The magnetic recording medium having the non-magnetic undercoat layer between the non-magnetic base film and the magnetic recording layer according to the present invention has the following properties.

The magnetic recording medium having the non-magnetic undercoat layer between the non-magnetic base film and the magnetic recording layer according to the present invention has a coercive force of usually 39.8 to 318.3 kA/m (500 to 4000 Oe); a squareness (residual magnetic flux density Br/saturation magnetic flux density Bm) of usually 0.82 to 0.95; a gloss (of the coating film) of usually 170 to 300%; a surface roughness Ra (of the coating film) of usually not more than 10.5 nm; a Young's modulus (relative value to a commercially available video tape: AV T-120 produced by Victor Company of Japan, Limited) of usually 126 to 160; a linear adsorption coefficient (of the coating film) of usually 1.20 to 5.0 μm$^{-1}$. As to the durability of the above magnetic recording medium, the running durability time thereof is usually not less than 22 minutes; and the scratch resistance thereof is usually rank A or B.

In case where the magnetic composite particles produced by using as core particles magnetic Co-coated acicular iron oxide particles which are not coated with hydroxides and/or oxides of aluminum and/or silicon, are used as magnetic particles, the magnetic recording medium having the non-magnetic undercoat layer between the non-magnetic base film and the magnetic recording layer according to the present invention has a coercive force of usually 39.8 to 135.3 kA/m (500 to 1700 Oe), preferably 43.8 to 135.3 kA/m (550 to 1700 Oe); a squareness (residual magnetic flux density Br/saturation magnetic flux density Bm) of usually 0.85 to 0.95, preferably 0.86 to 0.95; a gloss (of the coating film) of usually 170 to 300%, preferably 175 to 300%; a surface roughness Ra (of the coating film) of usually not more than 10.5 nm, preferably 2.0 to 10.0 nm, more preferably 2.0 to 9.5 nm; a Young's modulus (relative value to a commercially available video tape: AV T-120 produced by Victor Company of Japan, Limited) of usually 126 to 160, preferably 127 to 160; a linear adsorption coefficient (of the coating film) of usually 1.20 to 5.0 μm$^{-1}$, preferably 1.25 to 5.0 μm$^{-1}$. As to the durability of the above magnetic recording medium, the running durability time thereof is usually not less than 22 minutes, preferably not less than 23 minutes; and the scratch resistance thereof is usually rank A or B, preferably A.

In case where the magnetic composite particles produced by using as core particles magnetic acicular metal particles containing iron as a main component or magnetic acicular iron-based alloy particles which are not coated with hydroxides and/or oxides of aluminum and/or silicon, are used as magnetic particles, the magnetic recording medium having the non-magnetic undercoat layer between the non-magnetic base film and the magnetic recording layer according to the present invention has a coercive force of usually 63.7 to 278.5 kA/m (800 to 3500 Oe), preferably 71.6 to 278.5 kA/m (900 to 3500 Oe); a squareness (residual magnetic flux density Br/saturation magnetic flux density Bm) of usually 0.85 to 0.95, preferably 0.86 to 0.95; a gloss (of the coating film) of usually 190 to 300%, preferably 195 to 300%; a surface roughness Ra (of the coating film) of usually not more than 10.5 nm, preferably 2.0 to 10.0 nm, more preferably 2.0 to 9.5 nm; a Young's modulus (relative value to a commercially available video tape: AV T-120 produced by Victor Company of Japan, Limited) of usually 126 to 160, preferably 127 to 160; a linear adsorption coefficient (of the coating film) of usually 1.30 to 5.0 μm$^{-1}$, preferably 1.35 to 5.0 μm$^{-1}$. As to the durability of the above magnetic recording medium, the running durability time thereof is usually not less than 23 minutes, preferably not less than 24 minutes; and the scratch resistance thereof is usually rank A or B, preferably A.

In case where the magnetic composite particles produced by using as core particles magnetic plate-shaped particles which are not coated with hydroxides and/or oxides of aluminum and/or silicon, are used as magnetic particles, the magnetic recording medium having the non-magnetic undercoat layer between the non-magnetic base film and the magnetic recording layer according to the present invention has a coercive force of usually 39.8 to 318.3 kA/m (500 to 4000 Oe), preferably 51.7 to 318.3 kA/m (650 to 4000 Oe);

a squareness (residual magnetic flux density Br/saturation magnetic flux density Bm) of usually 0.82 to 0.95, preferably 0.83 to 0.95; a gloss (of the coating film) of usually 175 to 300%, preferably 180 to 300%; a surface roughness Ra (of the coating film) of usually not more than 10.5 nm, preferably 2.0 to 10.0 nm, more preferably 2.0 to 9.5 nm; a Young's modulus (relative value to a commercially available video tape: AV T-120 produced by Victor Company of Japan, Limited) of usually 126 to 160, preferably 127 to 160; a linear adsorption coefficient (of the coating film) of usually 1.20 to 5.0 $\mu m^{-1}$, preferably 1.25 to 5.0 $\mu m^{-1}$. As to the durability of the above magnetic recording medium, the running durability time thereof is usually not less than 23 minutes, preferably not less than 24 minutes; and the scratch resistance thereof is usually rank A or B, preferably A.

In case where the magnetic composite particles produced by using as core particles magnetic Co-coated acicular iron oxide particles which are coated with hydroxides and/or oxides of aluminum and/or silicon, are used as magnetic particles, the magnetic recording medium having the non-magnetic undercoat layer between the non-magnetic base film and the magnetic recording layer according to the present invention has a coercive force of usually 39.8 to 135.3 kA/m (500 to 1700 Oe), preferably 43.8 to 135.3 kA/m (550 to 1700 Oe); a squareness (residual magnetic flux density Br/saturation magnetic flux density Bm) of usually 0.85 to 0.95, preferably 0.86 to 0.95; a gloss (of the coating film) of usually 175 to 300%, preferably 180 to 300%; a surface roughness Ra (of the coating film) of usually not more than 9.5 nm, preferably 2.0 to 9.0 nm, more preferably 2.0 to 8.5 nm; a Young's modulus (relative value to a commercially available video tape: AV T-120 produced by Victor Company of Japan, Limited) of usually 128 to 160, preferably 129 to 160; a linear adsorption coefficient (of the coating film) of usually 1.20 to 5.0 $\mu m^{-1}$, preferably 1.25 to 5.0 $\mu m^{-1}$. As to the durability of the above magnetic recording medium, the running durability time thereof is usually not less than 23 minutes, preferably not less than 24 minutes; and the scratch resistance thereof is usually rank A or B, preferably A.

In case where the magnetic composite particles produced by using as core particles magnetic acicular metal particles containing iron as a main component or magnetic acicular iron-based alloy particles which are coated with hydroxides and/or oxides of aluminum and/or silicon, are used as magnetic particles, the magnetic recording medium having the non-magnetic undercoat layer between the non-magnetic base film and the magnetic recording layer according to the present invention has a coercive force of usually 63.7 to 278.5 kA/m (800 to 3500 Oe), preferably 71.6 to 278.5 kA/m (900 to 3500 Oe); a squareness (residual magnetic flux density Br/saturation magnetic flux density Bm) of usually 0.85 to 0.95, preferably 0.86 to 0.95; a gloss (of the coating film) of usually 195 to 300%, preferably 200 to 300%; a surface roughness Ra (of the coating film) of usually not more than 9.5 nm, preferably 2.0 to 9.0 nm, more preferably 2.0 to 8.5 nm; a Young's modulus (relative value to a commercially available video tape: AV T-120 produced by Victor Company of Japan, Limited) of usually 128 to 160, preferably 129 to 160; a linear adsorption coefficient (of the coating film) of usually 1.30 to 5.0 $\mu m^{-1}$, preferably 1.35 to 5.0 $\mu m^{-1}$. As to the durability of the above magnetic recording medium, the running durability time thereof is usually not less than 24 minutes, preferably not less than 25 minutes; and the scratch resistance thereof is usually rank A or B, preferably A.

In case where the magnetic composite particles produced by using as core particles magnetic plate-shaped particles which are coated with hydroxides and/or oxides of aluminum and/or silicon, are used as magnetic particles, the magnetic recording medium having the non-magnetic undercoat layer between the non-magnetic base film and the magnetic recording layer according to the present invention has a coercive force of usually 39.8 to 318.3 kA/m (500 to 4000 Oe), preferably 51.7 to 318.3 kA/m (650 to 4000 Oe); a squareness (residual magnetic flux density Br/saturation magnetic flux density Bm) of usually 0.82 to 0.95, preferably 0.83 to 0.95; a gloss (of the coating film) of usually 180 to 300%, preferably 185 to 300%; a surface roughness Ra (of the coating film) of usually not more than 10.0 nm, preferably 2.0 to 9.5 nm, more preferably 2.0 to 9.0 nm; a Young's modulus (relative value to a commercially available video tape: AV T-120 produced by Victor Company of Japan, Limited) of usually 127 to 160, preferably 128 to 160; a linear adsorption coefficient (of the coating film) of usually 1.20 to 5.0 $\mu m^{-1}$, preferably 1.25 to 5.0 $\mu m^{-1}$. As to the durability of the above magnetic recording medium, the running durability time thereof is usually not less than 24 minutes, preferably not less than 25 minutes; and the scratch resistance thereof is usually rank A or B, preferably A.

Next, the process for producing the magnetic composite particles according to the present invention, is described.

The magnetic composite particles of the present invention can be produced by mixing magnetic particles (A) or the magnetic composite particles precursor (B) as magnetic core particles with alkoxysilane compounds or polysiloxanes to coat the surfaces of the magnetic core particles with the alkoxysilane compounds or polysiloxanes; and then mixing the magnetic core particles coated with the alkoxysilane compounds or polysiloxanes, with phthalocyanine-based pigments.

The coating of the magnetic particles (A) or the magnetic composite particles precursor (B) as magnetic core particles with the alkoxysilane compounds, the polysiloxanes, the modified polysiloxanes, or the terminal-modified polysiloxanes, may be conducted (i) by mechanically mixing and stirring the magnetic particles (A) or the magnetic composite particles precursor (B) together with the alkoxysilane compounds, the polysiloxanes, the modified polysiloxanes, or the terminal-modified polysiloxanes; or (ii) by mechanically mixing and stirring both the components together while spraying the alkoxysilane compounds, the polysiloxanes, the modified polysiloxanes, or the terminal-modified polysiloxanes onto the magnetic core particles. In these cases, substantially whole amount of the alkoxysilane compounds, the polysiloxanes, the modified polysiloxanes, or the terminal-modified polysiloxanes added can be applied onto the surfaces of the magnetic core particles.

In addition, by conducting the above-mentioned mixing or stirring treatment (i) of the magnetic particles (A) or the magnetic composite particles precursor (B) as magnetic core particles together with the alkoxysilane compounds, at least a part of the alkoxysilane compounds coated on the magnetic core particles may be changed to the organosilane compounds. In this case, there is also no affection against the formation of the phthalocyanine-based pigments coat thereon.

In order to uniformly coat the surfaces of the magnetic particles (A) or the magnetic composite particles precursor (B) as magnetic core particles with the alkoxysilane compounds, the polysiloxanes, the modified polysiloxanes, or the terminal-modified polysiloxanes, it is preferred that the magnetic particles (A) or the magnetic composite particles precursor (B) are preliminarily diaggregated by using a pulverizer.

As apparatus (a) for mixing and stirring treatment (i) of the magnetic core particles with the alkoxysilane compounds, the polysiloxanes, the modified polysiloxanes, or the terminal-modified polysiloxanes to form the coating layer thereof, and as apparatus (b) for mixing and stirring treatment (ii) of the phthalocyanine-based pigments with the magnetic core particles whose surfaces are coated with the alkoxysilane compounds, the polysiloxanes, the modified polysiloxanes, or the terminal-modified polysiloxanes to form the phthalocyanine-based pigments coat, there may be preferably used those apparatus capable of applying a shear force to the particles, more preferably those apparatuses capable of conducting the application of shear force, spaturate force and compressed force at the same time. As such apparatuses, there may be exemplified wheel-type kneaders, ball-type kneaders, blade-type kneaders, roll-type kneaders or the like. Among them, wheel-type kneaders are preferred.

Specific examples of the wheel-type kneaders may include an edge runner (equal to a mix muller, a Simpson mill or a sand mill), a multi-mull, a Stotz mill, a wet pan mill, a Conner mill, a ring muller, or the like. Among them, an edge runner, a multi-mull, a Stotz mill, a wet pan mill and a ring muller are preferred, and an edge runner is more preferred.

Specific examples of the ball-type kneaders may include a vibrating mill or the like. Specific examples of the blade-type kneaders may include a Henschel mixer, a planetary mixer, a Nawter mixer or the like. Specific examples of the roll-type kneaders may include an extruder or the like.

The oxidation-susceptible magnetic particles such as magnetite particles, acicular magnetic metal particles containing iron as a main component and acicular magnetic iron alloy particles are preferably treated in a mixing apparatus purged with an inert gas such as $N_2$, in order to prevent magnetic properties thereof from being deteriorated by the oxidation.

In order to coat the surfaces of the magnetic core particles with the alkoxysilane compounds, the polysiloxanes, the modified polysiloxanes, or the terminal-modified polysiloxanes as uniformly as possible, the conditions of the above mixing or stirring treatment may be appropriately controlled such that the linear load is usually 19.6 to 1960 N/cm (2 to 200 Kg/cm), preferably 98 to 1470 N/cm (10 to 150 Kg/cm), more preferably 147 to 980 N/cm (15 to 100 Kg/cm); and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the alkoxysilane compounds, the polysiloxanes, the modified polysiloxanes, or the terminal-modified polysiloxanes added, is preferably 0.15 to 45 parts by weight based on 100 parts by weight of the magnetic particles (A) or the magnetic composite particles precursor (B) as magnetic core particles. When the amount of the alkoxysilane compounds, the polysiloxanes, the modified polysiloxanes or the terminal-modified polysiloxanes added is less than 0.15 part by weight, it may become difficult to adhere the phthalocyanine-based pigments in such an amount enough to obtain the magnetic composite particles according to the present invention. On the other hand, when the amount of the alkoxysilane compounds, the polysiloxanes, the modified polysiloxanes or the terminal-modified polysiloxanes added is more than 45 parts by weight, since a sufficient amount of the phthalocyanine-based pigments can be adhered on the surface of the coating layer, it is meaningless to add more than 45 parts by weight.

Next, the phthalocyanine-based pigments are added to the magnetic particles (A) or the magnetic composite particles precursor (B) as magnetic core particles, which are coated with the alkoxysilane compounds, the polysiloxanes, the modified polysiloxanes, or the terminal-modified polysiloxanes, and the resultant mixture is mixed and stirred to form the phthalocyanine-based pigments adhere on the surfaces of the coating layer composed of the alkoxysilane compounds, the polysiloxanes, the modified polysiloxanes or the terminal-modified polysiloxanes. The drying or heat-treatment may be conducted.

It is preferred that the phthalocyanine-based pigments are added little by little and slowly, especially about 5 to 60 minutes.

In order to form phthalocyanine-based pigments coat onto the coating layer composed of the alkoxysilane compounds, the polysiloxanes, the modified polysiloxanes, or the terminal-modified polysiloxanes as uniformly as possible, the conditions of the above mixing or stirring treatment can be appropriately controlled such that the linear load is usually 19.6 to 1960 N/cm (2 to 200 Kg/cm), preferably 98 to 1470 N/cm (10 to 150 Kg/cm), more preferably 147 to 980 N/cm (15 to 100 Kg/cm); and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The preferable amount of the phthalocyanine-based pigments added is 1 to 100 parts by weight based on 100 parts by weight of the magnetic particles (A) or the magnetic composite particles precursor (B). When the amount of the phthalocyanine-based pigments added is less than 1 parts by weight, it may be difficult to obtain magnetic composite particles having sufficient blackness and resin adsorptivity.

When the amount of the phthalocyanine-based pigment adhered is more than 100 parts by weight, although the obtained composite magnetic particles exhibit sufficient blackness and resin absorption, the phthalocyanine-based pigment tends to be desorbed from the surface of the composite magnetic particles because of too large amount of the phthalocyanine-based pigment adhered. As a result, the obtained composite magnetic particles tends to show a poor dispersibility in vehicle upon production of a magnetic coating material.

In case of drying the obtained magnetic composite particles, the temperature is usually 40 to 150° C., preferably 60 to 120° C. The treating time of these steps is usually from 10 minutes to 12 hours, preferably from 30 minutes to 3 hours.

When the obtained magnetic composite particles is subjected to the above step, the alkoxysilane compounds used as the coating thereof are finally converted into organosilane compounds.

If required, prior to mixing and stirring with the alkoxysilane compounds or polysiloxanes, the magnetic particles may be preliminarily coated with at least one compound selected from the group consisting of hydroxides of aluminum, oxides of aluminum, hydroxides of silicon and oxides of silicon to form an intermediate coating layer thereon.

At least a part of the surface of the magnetic particles may be coated with at least one compound selected from the group consisting of hydroxides of aluminum, oxides of aluminum, hydroxides of silicon and oxides of silicon (hereinafter referred to merely as "hydroxides and/or oxides of aluminum and/or silicon"), if required, in advance of mixing and stirring with the alkoxysilane compounds, the polysiloxanes, the modified polysiloxanes or the terminal-modified polysiloxanes.

The coating of the hydroxides and/or oxides of aluminum and/or silicon may be conducted by adding an aluminum compound, a silicon compound or both the compounds to a water suspension in which the magnetic particles are dispersed, followed by mixing and stirring, and further adjusting the pH value of the suspension, if required, thereby coating the surfaces of the magnetic particles with hydroxides and/or oxides of aluminum and/or silicon. The thus obtained magnetic particles coated with the hydroxides and/or oxides of aluminum and/or silicon are then filtered out, washed with water, dried and pulverized. Further, the magnetic particles coated with the hydroxides and/or oxides of aluminum and/or silicon may be subjected to post-treatments such as deaeration treatment and compaction treatment, if required.

As the aluminum compounds, there may be exemplified aluminum salts such as aluminum acetate, aluminum sulfate, aluminum chloride or aluminum nitrate, alkali aluminates such as sodium aluminate or the like.

The amount of the aluminum compound added is 0.01 to 20% by weight (calculated as Al) based on the weight of the magnetic particles. When the amount of the aluminum compound added is more than 20% by weight, since the amount of the aluminum compound increases, the magnetic properties of the magnetic particles may be deteriorated.

As the silicon compounds, there may be exemplified #3 water glass, sodium orthosilicate, sodium metasilicate or the like.

The amount of the silicon compound added is 0.01 to 20% by weight (calculated as $SiO_2$) based on the weight of the magnetic particles. When the amount of the silicon compound added is more than 20% by weight, since the amount of the silicon compound increases, the magnetic properties of the magnetic particles may be deteriorated.

In the case where both the aluminum and silicon compounds are used in combination for the coating, the total amount of the aluminum and silicon compounds added is preferably 0.01 to 20% by weight (calculated as a sum of Al and $SiO_2$) based on the weight of the magnetic particles.

Next, the production of the magnetic recording medium according to the present invention is described.

The magnetic recording medium according to the present invention can be produced by applying a magnetic coating composition which contains the magnetic composite particles, a binder resin and a solvent, to the surface of the non-magnetic base film, followed by drying, thereby forming the magnetic recording layer, magnetically orienting the magnetic layer, and then subjecting the thus obtained product to calendering and then curing.

Also, the magnetic recording medium having the non-magnetic undercoat layer can be produced by applying the non-magnetic coating material containing the non-magnetic particles, binder resin and solvent onto the non-magnetic base film by ordinary method to form a non-magnetic undercoat layer on the non-magnetic substrate; applying the magnetic coating material containing the composite magnetic particles, binder resin and solvent onto the non-magnetic undercoat layer by ordinary method to form a magnetic layer thereon; magnetically orienting the magnetic layer; and then subjecting the thus obtained product to calendering and then curing.

The kneading and dispersing of the magnetic coating composition and the non-magnetic coating composition may be performed using, for example, kneaders such as twin-screw kneader, twin-screw extruder, press kneader, twin-roll mill, triple-roll mill, or dispersing apparatuses such as ball mill, sand grinder, attritor, disper, homogenizer and ultrasonic dispersing device.

The coating of the magnetic coating composition and the non-magnetic coating composition may be conducted using a gravure coater, a reverse roll coater, a slit coater, a die coater or the like. The obtained coating film may be magnetically orientated using opposed magnets, solenoid magnet or the like.

As the solvents, there may be used methyl ethyl ketone, toluene, cyclohexanone, methyl isobutyl ketone, tetrahydrofuran, a mixture of these solvents or the like.

The total amount of the solvent used for the magnetic coating composition is 65 to 1,000 parts by weight based on 100 parts by weight of the magnetic composite particles. When the amount of the solvent used is less than 65 parts by weight, the viscosity of the magnetic coating composition prepared therefrom becomes too high, thereby making it difficult to apply the magnetic coating composition. On the other hand, when the amount of the solvent used is more than 1,000 parts by weight, the amount of the solvent volatilized during the formation of the coating film becomes too large, thereby rendering the coating process industrially disadvantageous.

The total amount of the solvent used for the non-magnetic coating composition is 50 to 1,000 parts by weight based on 100 parts by weight of the non-magnetic particles. When the amount of the solvent used is less than 50 parts by weight, the viscosity of the non-magnetic coating composition prepared therefrom may become too high, thereby making it difficult to apply the non-magnetic coating composition. On the other hand, when the amount of the solvent used is more than 1,000 parts by weight, the amount of the solvent volatilized during the formation of the coating film may become too large, thereby rendering the coating process industrially disadvantageous.

The point of the present invention is that the magnetic composite particles comprising magnetic particles, a coating layer formed on the surface of the magnetic particles which comprises at least one organosilicon compound composed of organosilane compounds obtainable from alkoxysilanes or polysiloxanes, and a phthalocyanine-based pigments coat adhered on the coating layer composed of the organosilicon compound, can exhibit a high resin absorption and an excellent dispersibility.

The reason why the magnetic composite particles of the present invention can exhibit a high resin absorption, is considered as follows. That is, since the phthalocyanine-based pigments are adhered onto the surface of the magnetic particles through the organosilicon compound coating layer, the obtained magnetic composite particles have the phthalocyanine-based pigments including a benzene ring on the surface thereof. Therefore, it is considered that the magnetic composite particles having such a structure are improved in compatibility with resins, especially with polyurethane resins ordinarily used in magnetic recording media.

The reason why the magnetic composite particles of the present invention can exhibit an excellent dispersibility, is considered as follows. That is, since the amount of the phthalocyanine-based pigments desorbed from the surface of the magnetic composite particles is very small, the magnetic composite particles can be well dispersed in resins without any significant influence by desorbed pigments. In addition, it is considered that since suitable irregularities are formed on the surface of the magnetic composite particles by adhering the phthalocyanine-based pigments onto the surface of the magnetic particles, the resultant magnetic composite particles can be prevented from being contacted and agglomerated with each other.

The magnetic recording medium having a magnetic recording layer containing the magnetic composite particles according to the present invention, can exhibit an excellent durability and a sufficient surface smoothness. The reason why the magnetic recording medium of the present invention can exhibit an excellent durability is considered as follows. That is, since the magnetic composite particles are improved in resin absorption as described above, the magnetic composite particles can exhibit an enhanced compatibility with resins used in the magnetic recording medium.

Also, the reason why the magnetic recording medium of the present invention can exhibit an excellent surface smoothness is considered as follows. That is, since the phthalocyanine-based pigments are strongly bonded onto the surface of the magnetic particles through the organosilicon compound coating layer, the amount of the phthalocyanine-based pigments desorbed from the surface of the magnetic composite particles is considerably reduced. As a result, the magnetic composite particles can be well dispersed in vehicles without any significant influence by desorbed pigments. The above fact as well as improved dispersibility of the magnetic composite particles themselves results in enhanced surface smoothness of the obtained magnetic recording medium.

Thus, the magnetic composite particles of the present invention can exhibit a high blackness, a high resin absorption and an excellent dispersibility and, therefore, can be suitably used as magnetic particles for magnetic recording media exhibiting excellent strength and durability.

Further, the magnetic recording medium of the present invention can exhibit excellent strength and durability due to the excellent resin absorption of the magnetic composite particles used therein and, therefore is suitable as a magnetic recording medium for high-density recording.

EXAMPLES

The present invention is described in more detail by Examples and Comparative Examples, but the Examples are only illustrative and, therefore, not intended to limit the scope of the present invention.

Various properties were evaluated by the following methods.

(1) The average particle size (average major axis diameter, average minor axis diameter, average plate diameter, average thickness and average particle diameter) of magnetic particles, magnetic composite particles and non-magnetic particles were respectively expressed by average values (measured in a predetermined direction) of about 350 particles which were sampled from a micrograph obtained by magnifying an original electron micrograph (×30,000) by four times in each of the longitudinal and transverse directions.

(2) The aspect ratio of the particles was expressed by a ratio of average major axis diameter to average minor axis diameter thereof. The plate ratio of the particles was expressed by a ratio of average particle diameter to average thickness thereof.

(3) The geometrical standard deviation of particle sizes was expressed by values obtained by the following method. That is, the particle sizes were measured from the above-magnified photograph. The actual particle sizes and the number of the particles were obtained from the calculation on the basis of the measured values. On a logarithmic normal probability paper, the particle sizes were plotted at regular intervals on the abscissa-axis and the accumulative number of particles belonging to each interval of the particle sizes were plotted by percentage on the ordinate-axis by a statistical technique. The particle sizes corresponding to the number of particles of 50% and 84.13%, respectively, were read from the graph, and the geometrical standard deviation was measured from the following formula:

Geometrical standard deviation={particle size corresponding to 84.13% under integration sieve}/{particle size (geometrical average diameter) corresponding to 50% under integration sieve }

The more the geometrical standard deviation nears 1.0, the more excellent the particle size distribution of the particles.

(4) The specific surface area was expressed by values measured by a BET method.

(5) The amounts of Al, Si, Co, Ti and Ni which were present within magtic particles, magnetic composite particles and non-magnetic particles, and/or on the surfaces thereof, the amount of Si contained in organosilicon compounds were measured by a fluorescent X-ray spectroscopy device 3063M (manufactured by RIGAKU DENKI KOGYO CO., LTD.) according to JIS K0119 "General rule of fluorescent X-ray analysis".

(6) The content of $Fe^{2+}$ in the magnetic particles is expressed by the value measured by the following chemical analysis method.

That is, 25 ml of a mixed solution composed of phosphoric acid and sulfuric acid at a mixing ratio of 2:1, was added to 0.5 g of magnetic particles, thereby dissolving the magnetic particles in the mixed solution. After several droplets of diphenylamine sulfonic acid as an indicator was added to the diluted solution, the solution was subjected to oxidation-reduction titration using an aqueous potassium bichromate solution. The titration was terminated when the diluted solution exhibited a violet color. The amount of $Fe^{2+}$ was measured from the amount of the aqueous potassium bichromate solution used up to the termination of the titration.

(7) The amount of the adhered phthalocyanine-based pigments of the magnetic composite particles was obtained by measuring the carbon content thereof using "HORIBA METAL CARBON/SULFUR ANALYZER EMIA-2200 MODEL" (manufactured by Horiba Seisakusho Co., Ltd.).

(8) The blackness of magnetic particles, magnetic composite particles and non-magnetic particles, were measured by the following method. That is, 0.5 g of sample particles and 1.5 ml of castor oil were intimately kneaded together by a Hoover's muller to form a paste. 4.5 g of clear lacquer was added to the obtained paste and was intimately mixed to form a paint. The paint was applied on a cast-coated paper by using a 6-mil applicator to produce a coating film piece (having a film thickness of about 30 $\mu$m). The thus obtained coating film piece was measured according to JIS Z 8729 by a multi-light source spectrographic calorimeter MSC-IS-2D (manufactured by SUGA SHIKENKI CO., LTD.) to determine a L* value of calorimetric indices thereof.

Here, the L* value represents a lightness, and the smaller the L* value, the more excellent the blackness.

(9) The desorption percentage of the phthalocyanine-based pigments desorbed from the magnetic composite particles, is expressed by the value measured by the following method. The closer to 0% the desorption percentage of the phthalocyanine-based pigments, the less the amount of the phthalocyanine-based pigments desorbed from the surface of the magnetic composite particles.

Three grams of the magnetic composite particles and 40 ml of ethanol were placed in a 50-ml precipitation tube, and subjected to ultrasonic dispersion for 20 minutes. The obtained dispersion was allowed to stand for 120 minutes, thereby separating the dispersion into the magnetic composite particles and the phthalocyanine-based pigments desorbed therefrom due to the difference in precipitating speed therebetween. Subsequently, the magnetic composite particles were mixed again with 40 ml of ethanol, and subjected to ultrasonic dispersion for 20 minutes. The obtained dispersion was allowed to stand for 120 minutes, thereby separating the dispersion into the magnetic composite particles and the phthalocyanine-based pigments. The thus separated magnetic composite particles were dried at 80° C. for one hour to measure the amount of the phthalocyanine-based pigments desorbed therefrom. The desorption percentage (%) of the phthalocyanine-based pigments is calculated according to the following formula:

Desorption percentage (%) of phthalocyanine-based pigments=$\{(Wa-We)/Wa\} \times 100$ wherein Wa represents an amount of the phthalocyanine-based pigments adhered onto the magnetic composite particles; and We represents an amount of the phthalocyanine-based pigments adhered onto the magnetic composite particles after desorption test.

(10) The amount of carbon black coat formed on the magnetic composite particles precursor was measured by "Horiba Metal, Carbon and Sulfur Analyzer EMIA-2200 Model" (manufactured by HORIBA SEISAKUSHO CO., LTD.).

(11) The thickness of carbon black coat formed on the surfaces of the magnetic composite particles precursor is expressed by the value which was obtained by first measuring an average thickness of carbon black coat formed onto the surfaces of the particles on a photograph ($\times 5,000,000$) obtained by magnifying (ten times) a micrograph ($\times 500,000$) produced at an accelerating voltage of 200 kV using a transmission-type electron microscope (JEM-2010, manufactured by JAPAN ELECTRON Co., Ltd.), and then calculating an actual thickness of carbon black coat formed from the measured average thickness.

(12) The desorption percentage of carbon black desorbed from the magnetic composite particles precursor was measured by the following method.

That is, 3 g of the magnetic composite particles precursor and 40 ml of ethanol were placed in a 50-ml precipitation pipe and then was subjected to ultrasonic dispersion for 20 minutes. Thereafter, the obtained dispersion was allowed to stand for 120 minutes, and separated the carbon black desorbed from the magnetic composite particles precursor on the basis of the difference in specific gravity therebetween. Next, the thus separated magnetic composite particles precursor were mixed again with 40 ml of ethanol, and the obtained mixture was further subjected to ultrasonic dispersion for 20 minutes. Thereafter, the obtained dispersion was allowed to stand for 120 minutes, thereby separating the magnetic composite particles precursor and carbon black desorbed, from each other. The thus separated magnetic composite particles precursor were dried at 100° C. for one hour, and then the carbon content thereof was measured by the "Horiba Metal, Carbon and Sulfur Analyzer EMIA-2200 Model" (manufactured by HORIBA SEISAKUSHO CO., LTD.). The desorption percentage (%) was calculated according to the following formula:

Desorption percentage of the carbon black (%)=$\{(W_{a'}-W_{e'})/W_{a'}\} \times 100$ wherein $W_{a'}$ represents an amount of carbon black initially adhered on the magnetic composite particles precursor; and $W_{e'}$ represents an amount of carbon black which still remains on the magnetic composite particles precursor after the above desorption test.

The closer to zero the desorption percentage (%), the smaller the amount of carbon black desorbed from the magnetic composite particles precursor.

(13) The resin adsorptivity of the particles represents the degree at which a resin is adsorbed to the particles. The closer to 100% the value obtained in the following manner, the firmer the resin adsorptivity to the particles surfaces in the vehicle and the more favorable.

The resin adsorptivity Ya was first obtained. 20 g of particles and 56 g of a mixed solvent (27.0 g of methyl ethyl ketone, 16.2 g of toluene, and 10.8 g of cyclohexanone) with 2 g of a vinyl chloride-vinyl acetate copolymer having a sodium sulfonate group dissolved therein were charged into a 100-ml polyethylene bottle together with 120 g of 3 mmϕ steel beads. The particles and the solvent were mixed and dispersed by a paint shaker for 60 minutes.

Thereafter, 50 g of the coating composition was taken out, and charged into a 50-ml settling cylinder. The solid content was separated from the solvent portion by the centrifugalization at a rate of 10000 rpm for 15 minutes. The concentration of the solid resin content contained in the solvent portion was determined by a gravimetric method and the resin content existing in the solid portion was determined by deducting the obtained resin content from the amount of the resin charged as the resin adsorptivity Ya (mg/g) to the particles.

The total quantity of separated solid content was taken into a 100 ml-tall beaker, and 50 g of a mixed solvent (25.0 g of methyl ethyl ketone, 15.0 g of toluene, and 10.0 g of cyclohexanone) was added thereto. The obtained mixture was to ultrasonic dispersion for 15 minutes, and the thus-obtained suspension was charged into a 50-ml settling cylinder. The solid content was separated from the solvent portion by centrifuging them at a rate of 10000 rpm for 15 minutes. The concentration of the solid resin content contained in the solvent portion was measured so as to determine the resin content dissolved from the resin which had been adsorbed to the particle surfaces into the solvent phase.

The process from the step of taking the solid content into the 100 ml-tall beaker to the determination of the resin content dissolved into the solvent phase was repeated twice. The total quantity Ye (mg/g) of resin content dissolved into the solvent phase in the three cycles was obtained, and the value calculated in accordance with the following formula is expressed as the resin adsorptivity T(%):

$$T(\%)=[(Ya-Ye)/Ya] \times 100.$$

(14) The magnetic properties of the magnetic particles, magnetic composite particles and magnetic recording medium were measured using a vibration sample magnetometer "VSM-3S-15" (manufactured by Toei Kogyo Co., Ltd.) by applying thereto, an external magnetic field of 795.8 kA/m (10 kOe) (39.79 kA/m (5 koe) in the case where cobalt-coated magnetic iron oxide particles were used as magnetic particles). The magnetic properties of the magnetic tape were similarly measured by applying thereto, an external magnetic field of 795.8 kA/m (10 kOe) (39.79 kA/m (5 kOe) in the case where cobalt-coated magnetic iron oxide particles were used as magnetic particles).

(15) The viscosity of the coating composition was obtained by measuring the viscosity of the coating composition at 25° C. at a shear rate D of 1.92 sec$^{-1}$ by using "E type viscometer EMD-R" (manufactured by TOKYO KEIKI, CO., LTD.).

(16) The gloss of the surface of the coating film of the magnetic recording layer was measured at an angle of incidence of 45° by "glossmeter UGV-5D" (manufactured by SUGA SHIKENKI, CO., LTD.).

(17) The surface roughness Ra is expressed by the center-line average roughness of the surface of the coating film by using "Surfcom-575A" (manufactured by TOKYO SEIMITSU CO., LTD.).

(18) The strength of the coating film was expressed the Young's modulus obtained by "Autograph" (produced by SHIMAZU SEISAKUSHO Co., Ltd.). The Young's modulus was expressed by the ratio of the Young's modulus of the coating film to that of a commercially available video tape "AV T-120" (produce by VICTOR COMPANY OF JAPAN, LIMITED). The higher the relative value, the more the strength of the coating film is favorable.

(19) The light transmittance is expressed by the linear adsorption coefficient measured by using "UV-Vis Recording Spectrophotometer UV-2100" (manufactured by SHIMAZU SEISAKUSHO, Co. Ltd.). The linear adsorption coefficient is defined by the following formula, and the larger the value, the more the transmittance of light become difficult:

Linear adsorption coefficient $(\mu m^{-1})=\{1\ n\ (1/t)\}/FT$ wherein t represents a light transmittance (-) at 900 nm, and FT represents thickness ($\mu m$) of the coating composition of the film used for the measurement.

As a blank for measuring the linear adsorption coefficient, the non-magnetic base film was used.

(20) The durability of the magnetic medium was evaluated by the following running durability and the scratch resistance.

The running durability was evaluated by the actual operating time under the conditions that the load was 1.96 N (200 gw) and the relative speed of the head and the tape was 16 m/s by using "Media Durability Tester MDT-3000" (manufactured by Steinberg Associates). The longer the actual operating time, the higher the running durability.

The scratch resistance was evaluated by observing through the microscope the surface of the magnetic tape after running and visually judging the degree of scratching. Evaluation was divided into the following four ranks.

A: No scratch

B: A few scratches

C: Many scratches

D: Great many scratches

(21) The thickness of each of the base film, the non-magnetic undercoat layer and the magnetic recording layer constituting the magnetic recording medium was measured in the following manner by using "Digital Electronic Micrometer R351C" (manufactured by ANRITSU CORP.)

The thickness (A) of a non-magnetic base film was first measured. Similarly, the thickness (B) (B=the sum of the thicknesses of the non-magnetic base film and the non-magnetic undercoat layer) of a non-magnetic substrate obtained by forming a non-magnetic undercoat layer on the non-magnetic base film was measured. Furthermore, the thickness (C) (C=the sum of the thicknesses of the non-magnetic base film, the non-magnetic undercoat layer and the magnetic recording layer) of a magnetic recording medium obtained by forming a magnetic recording layer on the non-magnetic substrata was measured. The thickness of the non-magnetic undercoat layer is expressed by (B)–(A), and the thickness of the magnetic recording layer is expressed by (C)–(B).

Alternatively, the thickness of each of the non-magnetic base film and the magnetic recording layer constituting the magnetic recording medium was measured in the following manner. The thickness (A) of a non-magnetic base film was first measured, and the thickness (C) (C=the sum of the thicknesses of the non-magnetic base film and the magnetic recording layer) of a magnetic recording medium obtained by forming a magnetic recording layer on the non-magnetic substrate was measured. The thickness of the magnetic recording layer is expressed by (C)–(A).

Example 1

<Production of Magnetic Composite Particles>

20 kg of acicular cobalt-coated magnetite particles containing cobalt and $Fe^{2+}$ in amounts of 1.83% by weight and 15.3% by weight, respectively, based on the weight of magnetic particles (average major axis diameter: 0.251 $\mu m$; aspect ratio: 8.0:1; geometrical standard deviation value: 1.38; BET specific surface area value:38.5 $m^2/g$; blackness (L* value): 23.1; resin absorption: 48.2%; coercive force value: 55.0 kA/m (691 Oe); saturation magnetization value: 80.6 $Am^2/kg$ (80.6 emu/g)), were deagglomerated in 150 liters of pure water using a stirrer, and further passed through a "TK pipeline homomixer" (tradename, manufactured by Tokushu Kika Kogyo Co., Ltd.) three times, thereby obtaining a slurry containing the acicular cobalt-coated magnetite particles.

Successively, the obtained slurry containing the acicular cobalt-coated magnetite particles was passed through a transverse-type sand grinder (tradename "MIGHTY MILL MHG-1.5L", manufactured by Inoue Seisakusho Co., Ltd.) five times at an axis-rotating speed of 2,000 rpm, thereby obtaining a slurry in which the acicular cobalt-coated magnetite particles were dispersed.

The particles in the obtained slurry which remained on a sieve of 325 meshes (mesh size: 44 $\mu m$) was 0%. The slurry was filtered and washed with water, thereby obtaining a filter cake containing the acicular cobalt-coated magnetite particles. After the obtained filter cake containing the acicular cobalt-coated magnetite particles was dried at 120° C., 11.0 kg of the dried particles were then charged into an edge runner "MPUV-2 Model" (tradename, manufactured by Matsumoto Chuzo Tekkosho Co., Ltd.), and mixed and stirred at 392 N/cm (40 Kg/cm) for 15 minutes while introducing thereinto a $N_2$ gas at a rate of 2 liters/minute, thereby lightly deagglomerating the particles.

Next, 220 g of methyltriethoxysilane was mixed and diluted with 200 ml of ethanol to obtain an ethanol solution of methyltriethoxysilane. The solution was added to the deagglomerated acicular cobalt-coated magnetite particles under the operation of the edge runner. The acicular cobalt-coated magnetite particles were continuously mixed and stirred at a linear load of 294 N/cm (30 Kg/cm) for 20 minutes.

Then, 1100 g of phthalocyanine-based pigments A (particle shape: granular shape; average particle size: 0.06 $\mu m$; BET specific surface area value: 71.6 $m^2/g$; blackness (L* value): 17.7) were added to the above mixture for 10 minutes while operating the edge runner. Further, the obtained mixture was mixed and stirred at a linear load of 294 N/cm (30 Kg/cm) and a stirring speed of 22 rpm for 30 minutes to adhere the phthalocyanine-based pigments on the methyltriethoxysilane coating layer formed on the particles, and then heat-treated at 80° C. for 120 minutes using a dryer, thereby obtaining acicular magnetic composite particles.

The obtained acicular magnetic composite particles had an average major axis diameter of 0.252 $\mu m$, an aspect ratio of 8.0:1, a geometrical standard deviation value of 1.38, a BET specific surface area value of 39.6 $m^2/g$, a blackness (L* value) of 19.8, a resin absorption of 78.0%, a desorption percentage of phthalocyanine-based pigments of 6.9%, a coercive force value of 54.5 kA/m (685 Oe) and a saturation magnetization value of 77.0 $Am^2/kg$ (77.0 emu/g). The amount of a coating layer composed of organosilane compounds produced from methyltriethoxysilane was 0.31% by weight (calculated as Si). The amount of the phthalocyanine-based pigments adhered was 6.03% by weight (calculated as C) (corresponding to 10 parts by weight based on 100 parts by weight of the acicular cobalt-coated magnetite particles). As a result of the observation of electron micrograph, almost no phthalocyanine-based pigments liberated were recognized, so that it was confirmed that a substantially whole amount of the phthalocyanine-based pigments added were adhered on the coating layer composed of the organosilane compounds obtainable from methyltriethoxysilane.

<Production of Magnetic Recording Medium>

12 g of the above obtained acicular magnetic composite particles were mixed with 1.2 g of abrasives (tradename "AKP-30" produced by Sumitomo Kagaku Co., Ltd.), carbon black (tradename "#2400B" produced by Mitsubishi Kasei Co., Ltd.), a binder resin solution (containing 30% by weight of a vinyl chloride-vinyl acetate copolymer resin having a sodium sulfonate group, and 70% by weight of cyclohexanone) and cyclohexanone, thereby obtaining a mixture having a solid content of 78%. The resultant mixture was further kneaded for 30 minutes using a plast-mill, thereby obtaining a kneaded material.

The thus obtained kneaded material together with 95 g of 1.5 mmφ glass beads, an additional binder resin solution (comprising 30% by weight of a polyurethane resin having a sodium sulfonate group and 70% by weight of a mixed solvent containing methyl ethyl ketone and toluene at a mixing ratio of 1:1), cyclohexanone, methyl ethyl ketone and toluene, were charged into a 140-ml glass bottle. The resultant mixture was mixed and dispersed for 6 hours using a paint shaker, thereby obtaining a magnetic coating composition. Then, the obtained magnetic coating composition was further mixed with a lubricant and a curing agent, and the resultant mixture was mixed and dispersed for 15 minutes using a paint shaker.

The obtained magnetic coating composition had the following composition.

| Composition of magnetic coating composition: | |
| --- | --- |
| Acicular magnetic composite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Abrasive (AKP-30) | 10 parts by weight |
| Carbon black (#2400B) | 0.5 part by weight |
| Lubricant (myristic acid: butyl stearate = 1:2) | 3.0 parts by weight |
| Curing agent (polyisocyanate) | 5.0 parts by weight |
| Cyclohexanone | 65.8 parts by weight |
| Methyl ethyl ketone | 164.5 parts by weight |
| Toluene | 98.7 parts by weight |

It was confirmed that the viscosity of the obtained magnetic coating composition was 2,848 cP.

Then, the obtained magnetic coating composition was applied onto a 12 μm-thick polyethylene terephthalate film using an applicator, thereby forming a coating layer having a thickness of 45 μm on the film. Successively, the obtained coating layer was magnetically oriented in a magnetic field and then dried. Then, the resultant film was subjected to calender treatment and then to curing reaction at 60° C. for 24 hours. The cured film was slit into a width of 1.27 cm (0.5 inch), thereby obtaining a magnetic tape. It was confirmed that the thickness of a magnetic recording layer formed on the obtained magnetic tape was 3.5 μm.

Further, it was confirmed that the obtained magnetic tape had a coercive force value of 56.8 kA/m (714 Oe), a squareness (Br/Bm) of 0.89, a gloss of 178%, a surface roughness Ra of 6.6 nm, a Young's modulus (relative value) of 141, a linear absorption of 1.36 cm$^{-1}$, a running durability of 28.3 minutes and a scratch resistance of rank A.

Core Particles 1 to 7:

Various magnetic particles produced by known methods were prepared.

Various properties of the thus prepared magnetic particles are shown in Table 1.

Core Particles 8:

The pH value of 150 liters of pure water was adjusted to 11.0 by adding an aqueous sodium hydroxide solution thereto. 20 kg of the acicular magnetic metal particles containing iron as a main component (core particles 1) were added to the thus pH-adjusted water, and deagglomerated using a stirrer. Then, the resultant mixture was passed through a HOMOMIC LINE MILL (manufactured by Tokushu Kika Kogyo Co., Ltd.) three times, thereby obtaining a slurry containing the acicular magnetic metal particles containing iron as a main component.

Water was added to the obtained slurry to adjust the concentration thereof to 98 g/liter. Then, 150 liters of the resultant slurry was taken out, and heated to 60° C. while stirring.

The slurry was further mixed with 5,444 ml of 1.0 mol/l sodium aluminate aqueous solution (corresponding to 1.0% by weight (calculated as Al) based on the weight of the acicular magnetic metal particles containing iron as a main component). The slurry was held for 30 minutes, and then the pH value of the slurry was adjusted to 8.5 by adding acetic acid thereto.

The resultant mixture was held for 30 minutes, and then filtered and washed with water. Successively, the mixture was dried and pulverized while continuously purged with a $N_2$ gas, thereby obtaining acicular magnetic metal particles containing iron as a main component which were covered with an intermediate coat composed of hydroxides of aluminum.

Main production conditions are shown in Table 2, and various properties of the obtained acicular magnetic metal particles containing iron as a main component which were covered with the intermediate coat are shown in Table 3.

Meanwhile, in the column "Kind of coating material" of "Surface-treating step" in Table 2, "A" represents hydroxides of aluminum, and "S" represents oxides of silicon.

Core Particles 9 to 11:

The same procedure as defined above for production of the core particles 8 was conducted except that kind of core particles, and kind and amount of additives added in the surface-treating step were changed variously, thereby obtaining magnetic particles covered with an intermediate coat.

Main treatment conditions are shown in Table 2, and various properties of the obtained magnetic particles covered with the intermediate coat are shown in Table 3.

Phthalocyanine-Based Pigments A to C:

Phthalocyanine-based pigments A to C having properties shown in Table 4 were prepared.

Examples 2 to 12 and Comparative Examples 1 to 4

The same procedure as defined in Example 1 was conducted except that kind of core particles, kind and amount of additives added in coating step with alkoxysilanes or polysiloxanes, treating conditions by an edge runner used in the coating step with alkoxysilanes or polysiloxanes, kind and amount of phthalocyanine-based pigments added in adhering step with phthalocyanine-based pigments, and treating conditions by an edge runner used in the adhering step with phthalocyanine-based pigments were changed variously, thereby obtaining magnetic composite particles. As a result of the observation of an electron micrograph of the magnetic composite particles obtained in Examples 2 to 12, almost no phthalocyanine-based pigments liberated were recognized. Therefore, it was confirmed that a substantially whole amount of the phthalocyanine-based pigments added were adhered onto a coat composed of organosilane compounds obtainable from alkoxysilanes, or polysiloxanes.

Main treatment conditions are shown in Table 5, and various properties of the obtained magnetic composite particles are shown in Table 6.

Examples 13 to 23 and Comparative Examples 5 to 10

<Production of Magnetic Recording Medium>

The same procedure as defined in Example 1 was conducted except that kind of magnetic particles were changed variously, thereby obtaining magnetic recording media.

Main production conditions and various properties of the obtained magnetic recording media are shown in Table 7.

<Production of Non-Magnetic Undercoat Layer>

Non-Magnetic Particles 1 to 6:

Various properties of non-magnetic particles 1 to 6 are shown in Table 8.

Non-Magnetic Undercoat Layer 1:

12 g of hematite particles as the non-magnetic particles 1 were mixed with a binder resin solution (containing 30% by weight of a vinyl chloride-vinyl acetate copolymer resin having a sodium sulfonate group, and 70% by weight of cyclohexanone) and cyclohexanone, thereby obtaining a mixture having a solid content of 72%. The resultant mixture was further kneaded for 30 minutes using a plast-mill, thereby obtaining a kneaded material.

The thus obtained kneaded material together with 95 g of 1.5 mmφ glass beads, an additional binder resin solution (comprising 30% by weight of a polyurethane resin having a sodium sulfonate group and 70% by weight of a mixed solvent containing methyl ethyl ketone and toluene at a mixing ratio of 1:1), cyclohexanone, methyl ethyl ketone and toluene, were charged into a 140-ml glass bottle. The resultant mixture was mixed and dispersed for 6 hours using a paint shaker, thereby obtaining a coating material. Then, the obtained coating material was further mixed with a lubricant, and the resultant mixture was mixed and dispersed for 15 minutes using a paint shaker.

The obtained non-magnetic coating composition had the following composition.

| Composition of non-magnetic coating composition: | |
|---|---|
| Non-magnetic particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Lubricant (myristic acid: butyl stearate = 1:1) | 2 parts by weight |
| Cyclohexanone | 56.9 parts by weight |

| -continued | |
|---|---|
| Composition of non-magnetic coating composition: | |
| Methyl ethyl ketone | 142.3 parts by weight |
| Toluene | 85.4 parts by weight |

Then, the obtained non-magnetic coating composition was applied onto a 12 μm-thick polyethylene terephthalate film using a slit coater, and then dried, thereby forming a non-magnetic undercoat layer on the film.

Main production conditions and various properties of the obtained non-magnetic undercoat layer are shown in Table 9.

Non-Magnetic Undercoat Layers 2 to 6:

The same procedure as defined above for production of the undercoat layer 1 was conducted except that kind of non-magnetic particles were changed variously, thereby obtaining non-magnetic undercoat layers.

Main production conditions and various properties of the obtained non-magnetic undercoat layers are shown in Table 9.

<Production of Magnetic Recording Medium Having a Non-Magnetic Undercoat Layer>

Example 24

The magnetic coating composition was produced by the same method as defined in Example 1 except that the magnetic composite particles obtained in Example 2 were used.

The obtained magnetic coating composition was applied onto the undercoat layer 1 using an applicator, thereby forming a coating layer having a thickness of 15 μm thereon. Successively, the obtained coating layer was magnetically oriented in a magnetic field and then dried. Then, the coating layer was subjected to calender treatment and then to curing reaction at 60° C. for 24 hours. The resultant film was slit into a width of 1.27 cm (0.5 inch), thereby obtaining a magnetic tape.

Main production conditions and various properties of the obtained magnetic recording medium are shown in Table 10.

Examples 25 to 34 and Comparative Examples 11 to 16

The same procedure as defined in Example 24 was conducted except that kind of non-magnetic undercoat layer and kind of magnetic particles were changed variously, thereby obtaining magnetic recording media.

Main production conditions and various properties of the obtained magnetic recording media are shown in Table 10.

TABLE 1

| Core particles | Kind of magnetic particles | Properties of magnetic particles Shape |
|---|---|---|
| Core particles 1 | Acicular magnetic metal particles containing iron as a main component (Al content: 2.71 wt %; Co content: 5.78 wt %) | Spindle-shaped |
| Core particles 2 | Co-coated magnetite particles (Co content: 4.72 wt %; $Fe^{2+}$ content: 15.6 wt %) | Spindle-shaped |

TABLE 1-continued

| Core particles | | |
|---|---|---|
| Core particles 3 | Co-coated maghemite particles (Co content: 2.74 wt %) | Acicular |
| Core particles 4 | Barium ferrite particles (Ti/Fe: 1.5 mol %; Ni/Fe: 2.8 mol %) | Plate-shaped |
| Core particles 5 | Acicular magnetic metal particles containing iron as a main component (Al content: 2.71 wt %; Co content: 5.78 wt %) | Spindle-shaped |
| Core particles 6 | Co-coated magnetite particles (Co content: 4.72 wt %; Fe$^{2+}$ content: 15.6 wt %) | Spindle-shaped |
| Core particles 7 | Barium ferrite particles (Ti/Fe: 1.5 mol %; Ni/Fe: 2.8 mol %) | Plate-shaped |

Properties of magnetic particles

| Core particles | Average particles diameter ($\mu$m) | Aspect ratio (plate ratio) (–) | Geometrical standard deviation value (–) |
|---|---|---|---|
| Core particles 1 | 0.126 | 7.2:1 | 1.39 |
| Core particles 2 | 0.151 | 6.9:1 | 1.43 |
| Core particles 3 | 0.275 | 8.2:1 | 1.41 |
| Core particles 4 | 0.032 | 3.6:1 | 1.40 |
| Core particles 5 | 0.100 | 7.6:1 | 1.38 |
| Core particles 6 | 0.213 | 8.0:1 | 1.36 |
| Core particles 7 | 0.033 | 3.7:1 | 1.38 |

Properties of magnetic particles

| Core particles | BET specific surface area value (m$^2$/g) | Amount of carbon black adhered (wt. %) |
|---|---|---|
| Core particles 1 | 53.5 | — |
| Core particles 2 | 52.6 | — |
| Core particles 3 | 36.1 | — |
| Core particles 4 | 58.8 | — |
| Core particles 5 | 55.1 | 6.88 |
| Core particles 6 | 31.6 | 9.01 |
| Core particles 7 | 55.9 | 5.62 |

Properties of magnetic particles

| Core particles | Coercive force value | | Saturation magnetization value | |
|---|---|---|---|---|
| | kA/m | Oe | Am$^2$/kg | emu/g |
| Core particles 1 | 152.6 | 1,918 | 136.1 | 136.1 |
| Core particles 2 | 72.6 | 912 | 81.0 | 81.0 |
| Core particles 3 | 54.7 | 687 | 77.1 | 77.1 |
| Core particles 4 | 205.9 | 2,587 | 50.1 | 50.1 |
| Core particles 5 | 148.8 | 1,870 | 133.6 | 133.6 |
| Core particles 6 | 55.4 | 696 | 76.3 | 76.3 |
| Core particles 7 | 197.6 | 2,483 | 48.6 | 48.6 |

Properties of magnetic particles

| Core particles | Blackness (L* value) (–) | Resin absorption (%) |
|---|---|---|
| Core particles 1 | 22.5 | 52.6 |
| Core particles 2 | 22.1 | 48.6 |
| Core particles 3 | 24.6 | 46.5 |
| Core particles 4 | 31.6 | 43.2 |
| Core particles 5 | 19.4 | 56.3 |
| Core particles 6 | 18.8 | 52.1 |
| Core particles 7 | 23.2 | 49.5 |

TABLE 2

Coating step with intermediate coat Additives

| Core particles | Kind of core particles | Kind | Calculated as | Amount added (wt. %) |
|---|---|---|---|---|
| Core particles 8 | Core particles 1 | Sodium aluminate | Al | 1.00 |
| Core particles 9 | Core particles 2 | Water glass #3 | SiO$_2$ | 0.50 |
| Core particles 10 | Core particles 3 | Aluminum sulfate | Al | 2.00 |
| | | Water glass #3 | SiO$_2$ | 0.50 |
| Core particles 11 | Core particles 4 | Water glass #3 | SiO$_2$ | 0.75 |

Coating step with intermediate coat Coating material

| Core particles | Kind | Calculated as | Amount coated (wt. %) |
|---|---|---|---|
| Core particles 8 | A | Al | 0.99 |
| Core particles 9 | S | SiO$_2$ | 0.49 |
| Core particles 10 | A | Al | 1.93 |
| | S | SiO$_2$ | 0.47 |
| Core particles 11 | S | SiO$_2$ | 0.72 |

TABLE 3

Properties of magnetic particles covered with intermediate coat

| Core particles | Average particle diameter ($\mu$m) | Aspect ratio (plate ratio) (-) | Geometrical standard deviation value (-) | BET specific surface area value ($m^2/g$) |
|---|---|---|---|---|
| Core particles 8 | 0.127 | 7.1:1 | 1.39 | 53.3 |
| Core particles 9 | 0.151 | 6.8:1 | 1.43 | 53.6 |
| Core particles 10 | 0.275 | 8.2:1 | 1.40 | 36.5 |
| Core particles 11 | 0.032 | 3.6:1 | 1.40 | 60.1 |

Properties of magnetic particles covered with intermediate coat

| Core particles | Coercive force value kA/m | Coercive force value Oe | Saturation magnetization value $Am^2/kg$ | Saturation magnetization value emu/g |
|---|---|---|---|---|
| Core particles 8 | 150.5 | 1,891 | 130.6 | 130.6 |
| Core particles 9 | 72.1 | 906 | 80.1 | 80.1 |
| Core particles 10 | 54.1 | 680 | 76.1 | 76.1 |
| Core particles 11 | 206.1 | 2,590 | 49.6 | 49.6 |

Properties of magnetic particles covered with intermediate coat

| Core particles | Blackness (L* value) (-) | Resin absorption (%) |
|---|---|---|
| Core particles 8 | 22.8 | 56.5 |
| Core particles 9 | 22.3 | 53.2 |
| Core particles 10 | 24.9 | 51.6 |
| Core particles 11 | 31.8 | 48.3 |

TABLE 4

Properties of phthalocyanine-based pigments

| Phthalocyanine-based pigments | Kind | Particle shape |
|---|---|---|
| Phthalocyanine-based pigments A | Phthalocyanine blue | Granular |
| Phthalocyanine-based pigments B | Phthalocyanine blue | Granular |
| Phthalocyanine-based pigments C | Phthalocyanine blue | Granular |

Properties of phthalocyanine-based pigments

| Phthalocyanine-based pigments | Average particle diameter ($\mu$m) | BET specific surface area value ($m^2/g$) | Blackness (L* value) (-) |
|---|---|---|---|
| Phthalocyanine-based pigments A | 0.06 | 71.6 | 17.7 |
| Phthalocyanine-based pigments B | 0.08 | 56.3 | 17.3 |
| Phthalocyanine-based pigments C | 0.10 | 45.2 | 16.9 |

TABLE 5

Production of magnetic composite particles Coating step with alkoxysilanes or polysiloxanes Additives

| Examples and Comparative Examples | kind of core particles | Kind | Amount added (weight part) |
|---|---|---|---|
| Example 2 | Core particles 1 | Methyltriethoxysilane | 2.0 |
| Example 3 | Core particles 2 | Methyltrimethoxysilane | 1.0 |
| Example 4 | Core particles 3 | Phenyltriethoxysilane | 1.0 |
| Example 5 | Core particles 4 | Methyl hydrogen polysiloxane | 2.0 |
| Example 6 | Core particles 5 | Methyltriethoxysilane | 2.0 |
| Example 7 | Core particles 6 | Phenyltriethoxysilane | 1.0 |
| Example 8 | Core particles 7 | Methyltrimethoxysilane | 3.0 |
| Example 9 | Core particles 8 | Isobutyltrimethoxysilane | 2.0 |
| Example 10 | Core particles 9 | Methyltriethoxysilane | 1.5 |
| Example 11 | Core particles 10 | Methyltrimethoxysilane | 2.0 |
| Example 12 | Core particles 11 | Phenyltriethoxysilane | 2.0 |
| Comparative Example 1 | Core particles 1 | — | — |
| Comparative Example 2 | Core particles 1 | Methyltriethoxysilane | 1.0 |
| Comparative Example 3 | Core particles 1 | Methyltriethoxysilane | 1.0 |
| Comparative Example 4 | Core particles 1 | Methyltriethoxysilane | 0.005 |

Production of magnetic composite particles Coating step with alkoxysilanes or polysiloxanes

| Examples and Comparative Examples | Edge runner treatment Linear load N/cm | Edge runner treatment Linear load Kg/cm | Edge runner treatment Time (min) | Amount coated (calculated as Si) (wt. %) |
|---|---|---|---|---|
| Example 2 | 392 | 40 | 20 | 0.30 |
| Example 3 | 294 | 30 | 30 | 0.20 |
| Example 4 | 588 | 60 | 20 | 0.14 |
| Example 5 | 588 | 60 | 30 | 0.81 |
| Example 6 | 588 | 60 | 30 | 0.31 |
| Example 7 | 588 | 60 | 20 | 0.14 |
| Example 8 | 294 | 30 | 30 | 0.59 |
| Example 9 | 294 | 30 | 20 | 0.30 |
| Example 10 | 588 | 60 | 20 | 0.23 |
| Example 11 | 392 | 40 | 30 | 0.40 |
| Example 12 | 588 | 60 | 20 | 0.27 |
| Comparative Example 1 | — | — | — | — |
| Comparative Example 2 | 392 | 40 | 20 | 0.15 |

TABLE 5-continued

Production of magnetic composite particles
Coating step with phthalocyanine-based pigments
Phthalocyanine-based pigments

| Examples and Comparative Examples | Kind | Amount added (weight part) |
|---|---|---|
| Example 2 | A | 10.0 |
| Example 3 | B | 15.0 |
| Example 4 | C | 5.0 |
| Example 5 | A | 10.0 |
| Example 6 | A | 10.0 |
| Example 7 | A | 5.0 |
| Example 8 | A | 5.0 |
| Example 9 | B | 5.0 |
| Example 10 | C | 10.0 |
| Example 11 | A | 20.0 |
| Example 12 | B | 50.0 |
| Comparative Example 1 | A | 10.0 |
| Comparative Example 2 | — | — |
| Comparative Example 3 | A | 200.0 |
| Comparative Example 4 | A | 10.0 |

Production of magnetic composite particles
Coating step with phthalocyanine-based pigments

| Examples and Comparative Examples | Edge runner treatment Linear load N/cm | Edge runner treatment Linear load Kg/cm | Time (min) | Amount coated (calculated as C) (wt. %) |
|---|---|---|---|---|
| Example 2 | 392 | 40 | 20 | 6.01 |
| Example 3 | 588 | 60 | 30 | 8.67 |
| Example 4 | 294 | 30 | 30 | 3.14 |
| Example 5 | 588 | 60 | 20 | 6.00 |
| Example 6 | 588 | 60 | 30 | 6.02 |
| Example 7 | 588 | 60 | 20 | 3.12 |
| Example 8 | 588 | 60 | 30 | 3.14 |
| Example 9 | 294 | 30 | 30 | 3.14 |
| Example 10 | 441 | 45 | 30 | 6.01 |
| Example 11 | 588 | 60 | 20 | 11.05 |
| Example 12 | 588 | 60 | 30 | 22.19 |
| Comparative Example 1 | 392 | 40 | 20 | 6.01 |
| Comparative Example 2 | — | — | — | — |
| Comparative Example 3 | 392 | 40 | 20 | 44.33 |
| Comparative Example 4 | 392 | 40 | 20 | 6.01 |

TABLE 6

Properties of magnetic composite particles

| Examples and Comparative Examples | Average major axis diameter (μm) | Aspect ratio (-) | Geometrical standard deviation value (-) | BET specific surface area value (m²/g) |
|---|---|---|---|---|
| Example 2 | 0.127 | 7.1:1 | 1.39 | 54.6 |
| Example 3 | 0.152 | 6.8:1 | 1.43 | 53.2 |
| Example 4 | 0.276 | 8.0:1 | 1.41 | 37.2 |
| Example 5 | 0.035 | 3.6:1 | 1.40 | 60.1 |
| Example 6 | 0.101 | 7.5:1 | 1.38 | 56.3 |
| Example 7 | 0.213 | 7.9:1 | 1.36 | 32.8 |
| Example 8 | 0.034 | 3.6:1 | 1.38 | 56.3 |
| Example 9 | 0.127 | 7.0:1 | 1.39 | 54.5 |
| Example 10 | 0.151 | 6.7:1 | 1.43 | 54.1 |
| Example 11 | 0.276 | 8.0:1 | 1.41 | 38.3 |
| Example 12 | 0.036 | 3.5:1 | 1.40 | 64.2 |
| Comparative Example 1 | 0.126 | 7.2:1 | — | 80.7 |
| Comparative Example 2 | 0.126 | 7.2:1 | 1.39 | 51.6 |
| Comparative Example 3 | 0.130 | 6.8:1 | — | 141.3 |
| Comparative Example 4 | 0.126 | 7.2:1 | — | 77.1 |

Properties of magnetic composite particles

| Examples and Comparative Examples | Coercive force value kA/m | Coercive force value Oe | Saturation magnetization value Am²/kg | Saturation magnetization value emu/g |
|---|---|---|---|---|
| Example 2 | 151.7 | 1,906 | 129.3 | 129.3 |
| Example 3 | 72.1 | 906 | 76.4 | 76.4 |
| Example 4 | 54.4 | 683 | 73.2 | 73.2 |
| Example 5 | 204.7 | 2,572 | 46.1 | 46.1 |
| Example 6 | 148.4 | 1,865 | 129.5 | 129.5 |
| Example 7 | 55.1 | 693 | 72.6 | 72.6 |
| Example 8 | 196.6 | 2,470 | 43.9 | 43.9 |
| Example 9 | 150.2 | 1,888 | 126.2 | 126.2 |
| Example 10 | 71.6 | 900 | 75.1 | 75.1 |
| Example 11 | 53.3 | 670 | 71.0 | 71.0 |
| Example 12 | 204.6 | 2,571 | 42.1 | 42.1 |
| Comparative Example 1 | 152.0 | 1,910 | 128.6 | 128.6 |
| Comparative Example 2 | 152.4 | 1,915 | 135.3 | 135.3 |
| Comparative Example 3 | 147.5 | 1,853 | 53.2 | 53.2 |
| Comparative Example 4 | 151.5 | 1,904 | 127.4 | 127.4 |

Properties of magnetic composite particles

| Examples and Comparative Examples | Blackness (L* value) (-) | Resin absorption (%) | Desorption percentage of phthalocyanine-based pigments (%) |
|---|---|---|---|
| Example 2 | 19.9 | 79.8 | 6.8 |
| Example 3 | 19.3 | 78.3 | 8.6 |
| Example 4 | 20.6 | 75.6 | 6.1 |
| Example 5 | 22.4 | 74.2 | 7.6 |
| Example 6 | 18.7 | 80.2 | 5.3 |
| Example 7 | 18.6 | 79.6 | 4.8 |
| Example 8 | 20.0 | 77.6 | 4.9 |
| Example 9 | 20.4 | 80.9 | 2.6 |
| Example 10 | 19.9 | 81.4 | 3.2 |
| Example 11 | 19.8 | 80.6 | 4.6 |
| Example 12 | 19.5 | 81.3 | 4.6 |
| Comparative Example 1 | 20.1 | 51.5 | 61.2 |
| Comparative Example 2 | 22.7 | 53.6 | — |
| Comparative Example 3 | 18.0 | 57.3 | 39.1 |
| Comparative Example 4 | 20.0 | 52.2 | 41.3 |

TABLE 7

| Examples and Comparative Examples | Production of magnetic recording medium Kind of magnetic particles | Weight ratio of particles to resin (—) | Properties of coating material Viscosity (cP) |
|---|---|---|---|
| Example 13 | Example 2 | 5.0 | 8,984 |
| Example 14 | Example 3 | 5.0 | 3,575 |
| Example 15 | Example 4 | 5.0 | 2,560 |
| Example 16 | Example 5 | 5.0 | 4,704 |
| Example 17 | Example 6 | 5.0 | 8,150 |
| Example 18 | Example 7 | 5.0 | 3,268 |
| Example 19 | Example 8 | 5.0 | 4,654 |
| Example 20 | Example 9 | 5.0 | 8,576 |
| Example 21 | Example 10 | 5.0 | 3,430 |
| Example 22 | Example 11 | 5.0 | 2,278 |
| Example 23 | Example 12 | 5.0 | 4,166 |
| Comparative Example 5 | Comparative Example 1 | 5.0 | 17,920 |
| Comparative Example 6 | Comparative Example 2 | 5.0 | 7,854 |
| Comparative Example 7 | Comparative Example 3 | 5.0 | 25,600 |
| Comparative Example 8 | Comparative Example 4 | 5.0 | 11,874 |
| Comparative Example 9 | Core particles 5 | 5.0 | 7,119 |
| Comparative Example 10 | Core particles 7 | 5.0 | 4,021 |

| Examples and Comparative Examples | Properties of magnetic recording medium Thickness of magnetic recording layer (μm) | Coercive force value kA/m | Coercive force value Oe |
|---|---|---|---|
| Example 13 | 3.5 | 154.9 | 1,946 |
| Example 14 | 3.5 | 75.0 | 943 |
| Example 15 | 3.4 | 56.5 | 710 |
| Example 16 | 3.6 | 207.9 | 2,612 |
| Example 17 | 3.5 | 152.5 | 1,916 |
| Example 18 | 3.5 | 56.7 | 713 |
| Example 19 | 3.5 | 200.5 | 2,520 |
| Example 20 | 3.5 | 153.0 | 1,923 |
| Example 21 | 3.5 | 74.4 | 935 |
| Example 22 | 3.5 | 56.7 | 713 |
| Example 23 | 3.5 | 207.9 | 2,612 |
| Comparative Example 5 | 3.6 | 153.6 | 1,930 |
| Comparative Example 6 | 3.5 | 153.8 | 1,933 |
| Comparative Example 7 | 3.6 | 151.6 | 1,905 |
| Comparative Example 8 | 3.6 | 153.7 | 1,931 |
| Comparative Example 9 | 3.5 | 153.4 | 1,928 |
| Comparative Example 10 | 3.5 | 201.1 | 2,527 |

| Examples and Comparative Examples | Properties of magnetic recording medium Br/Bm (—) | Gloss (%) | Surface roughness Ra (nm) | Young's modulus (relative value) |
|---|---|---|---|---|
| Example 13 | 0.88 | 230 | 6.8 | 140 |
| Example 14 | 0.89 | 179 | 6.6 | 142 |
| Example 15 | 0.90 | 177 | 6.5 | 143 |
| Example 16 | 0.88 | 186 | 7.8 | 138 |
| Example 17 | 0.89 | 235 | 6.5 | 141 |
| Example 18 | 0.90 | 183 | 6.3 | 143 |
| Example 19 | 0.88 | 189 | 7.4 | 144 |
| Example 20 | 0.89 | 237 | 6.6 | 142 |
| Example 21 | 0.90 | 183 | 6.3 | 143 |
| Example 22 | 0.91 | 187 | 6.4 | 145 |
| Example 23 | 0.88 | 191 | 7.2 | 139 |
| Comparative Example 5 | 0.82 | 190 | 21.6 | 127 |
| Comparative Example 6 | 0.85 | 204 | 14.6 | 126 |
| Comparative Example 7 | 0.72 | 177 | 33.8 | 113 |
| Comparative Example 8 | 0.82 | 193 | 19.6 | 128 |
| Comparative Example 9 | 0.88 | 228 | 7.4 | 135 |
| Comparative Example 10 | 0.87 | 182 | 8.2 | 135 |

| Examples and Comparative Examples | Properties of magnetic recording medium Linear absorption (μm⁻¹) | Durability Running durability (min) | Durability Scratch resistance (—) |
|---|---|---|---|
| Example 13 | 1.36 | 28.6 | B |
| Example 14 | 1.40 | 29.8 | A |
| Example 15 | 1.33 | ≧30 | A |
| Example 16 | 1.30 | 26.5 | B |
| Example 17 | 1.56 | ≧30 | A |
| Example 18 | 1.55 | ≧30 | A |
| Example 19 | 1.34 | 28.3 | A |
| Example 20 | 1.33 | 29.6 | A |
| Example 21 | 1.37 | ≧30 | A |
| Example 22 | 1.38 | ≧30 | A |
| Example 23 | 1.39 | 28.5 | A |
| Comparative Example 5 | 1.22 | 11.7 | D |
| Comparative Example 6 | 1.18 | 12.1 | C |
| Comparative Example 7 | 1.45 | 9.2 | D |
| Comparative Example 8 | 1.24 | 11.8 | D |
| Comparative Example 9 | 1.46 | 18.6 | C |
| Comparative Example 10 | 1.36 | 17.1 | C |

TABLE 8

| Kind of non-magnetic particles | Properties of non-magnetic particles for non-magnetic undercoat layer Kind | Shape |
|---|---|---|
| Non-magnetic particles 1 | Hematite particles | Spindle-shaped |
| Non-magnetic particles 2 | Goethite particles | Acicular |
| Non-magnetic particles 3 | Hematite particles | Acicular |
| Non-magnetic particles 4 | Hematite particles | Acicular |
| Non-magnetic particles 5 | Hematite particles | Acicular |
| Non-magnetic particles 6 | Goethite particles | Acicular |

TABLE 8-continued

| Kind of non-magnetic particles | Properties of non-magnetic particles for non-magnetic undercoat layer | | |
|---|---|---|---|
| | Average major axis diameter ($\mu$m) | Average minor axis diameter ($\mu$m) | Aspect ratio (-) |
| Non-magnetic particles 1 | 0.187 | 0.0240 | 7.8:1 |
| Non-magnetic particles 2 | 0.240 | 0.0272 | 8.8:1 |
| Non-magnetic particles 3 | 0.143 | 0.0210 | 6.8:1 |
| Non-magnetic particles 4 | 0.115 | 0.0179 | 6.4:1 |
| Non-magnetic particles 5 | 0.143 | 0.0211 | 6.8:1 |
| Non-magnetic particles 6 | 0.240 | 0.0273 | 8.8:1 |

| Kind of non-magnetic particles | Properties of non-magnetic particles for non-magnetic undercoat layer | | |
|---|---|---|---|
| | Geometrical standard deviation value (-) | BET specific surface area value (m$^2$/g) | Amount of Al coated (wt. %) |
| Non-magnetic particles 1 | 1.33 | 43.3 | — |
| Non-magnetic particles 2 | 1.37 | 86.3 | — |
| Non-magnetic particles 3 | 1.37 | 54.9 | 0.98 |
| Non-magnetic particles 4 | 1.35 | 58.3 | — |
| Non-magnetic particles 5 | 1.37 | 55.6 | — |
| Non-magnetic particles 6 | 1.35 | 88.1 | — |

| Kind of non-magnetic particles | Properties of non-magnetic particles for non-magnetic undercoat layer | | |
|---|---|---|---|
| | Al content (wt. %) | Amount of carbon black adhered (calculated as C) (wt. %) | Blackness (L* value) (-) |
| Non-magnetic particles 1 | — | — | 32.6 |
| Non-magnetic particles 2 | — | — | 34.6 |
| Non-magnetic particles 3 | — | — | 28.4 |
| Non-magnetic particles 4 | 0.67 | — | 29.6 |
| Non-magnetic particles 5 | — | 4.75 | 18.5 |
| Non-magnetic particles 6 | — | 4.81 | 20.3 |

TABLE 9

| Undercoat layer | Production of non-magnetic coating material | | Properties of coating material Viscosity (cP) |
|---|---|---|---|
| | Kind of non-magnetic particles | Weight ratio of particles to resin (-) | |
| Undercoat layer 1 | Non-magnetic particles 1 | 5.0 | 315 |
| Undercoat layer 2 | Non-magnetic particles 2 | 5.0 | 1,139 |
| Undercoat layer 3 | Non-magnetic particles 3 | 5.0 | 448 |
| Undercoat layer 4 | Non-magnetic particles 4 | 5.0 | 403 |
| Undercoat layer 5 | Non-magnetic particles 5 | 5.0 | 399 |
| Undercoat layer 6 | Non-magnetic particles 6 | 5.0 | 1,336 |

| Undercoat layer | Properties of non-magnetic undercoat layer | | |
|---|---|---|---|
| | Thickness ($\mu$m) | Gloss (%) | Surface roughness Ra (nm) |
| Undercoat layer 1 | 3.4 | 191 | 8.2 |
| Undercoat layer 2 | 3.5 | 180 | 12.0 |
| Undercoat layer 3 | 3.4 | 205 | 6.3 |
| Undercoat layer 4 | 3.4 | 211 | 6.2 |
| Undercoat layer 5 | 3.4 | 199 | 7.1 |
| Undercoat layer 6 | 3.5 | 185 | 9.0 |

| Undercoat layer | Properties of non-magnetic undercoat layer | |
|---|---|---|
| | Young's modulus (relative value) | Linear absorption ($\mu$m$^{-1}$) |
| Undercoat layer 1 | 124 | 1.03 |
| Undercoat layer 2 | 125 | 0.79 |
| Undercoat layer 3 | 126 | 1.01 |
| Undercoat layer 4 | 125 | 0.98 |
| Undercoat layer 5 | 125 | 1.52 |
| Undercoat layer 6 | 129 | 1.46 |

TABLE 10

| Examples and Comparative Examples | Production of magnetic coating material | | Weight ratio of particles to resin (-) |
|---|---|---|---|
| | Kind of magnetic particles | Kind of non-magnetic undercoat layer | |
| Example 24 | Example 2 | Undercoat layer 1 | 5.0 |
| Example 25 | Example 3 | Undercoat layer 2 | 5.0 |
| Example 26 | Example 4 | Undercoat layer 3 | 5.0 |
| Example 27 | Example 5 | Undercoat layer 4 | 5.0 |
| Example 28 | Example 6 | Undercoat layer 5 | 5.0 |
| Example 29 | Example 7 | Undercoat layer 6 | 5.0 |
| Example 30 | Example 8 | Undercoat layer 1 | 5.0 |
| Example 31 | Example 9 | Undercoat layer 2 | 5.0 |
| Example 32 | Example 10 | Undercoat layer 3 | 5.0 |
| Example 33 | Example 11 | Undercoat layer 4 | 5.0 |
| Example 34 | Example 12 | Undercoat layer 5 | 5.0 |
| Comparative Example 11 | Comparative Example 1 | Undercoat layer 1 | 5.0 |
| Comparative Example 12 | Comparative Example 2 | Undercoat layer 1 | 5.0 |
| Comparative Example 13 | Comparative Example 3 | Undercoat layer 1 | 5.0 |
| Comparative Example 14 | Comparative Example 4 | | |

TABLE 10-continued

| Examples and Comparative Examples | Core particles | Undercoat layer | |
|---|---|---|---|
| Comparative Example 15 | Core particles 5 | Undercoat layer 1 | 5.0 |
| Comparative Example 16 | Core particles 7 | Undercoat layer 1 | 5.0 |

| | Properties of coating material Viscosity (cP) | Properties of magnetic recording medium | | |
|---|---|---|---|---|
| Examples and Comparative Examples | | Thickness of magnetic recording layer (μm) | Coercive force value kA/m | Oe |
| Example 24 | 9,010 | 1.1 | 155.1 | 1,949 |
| Example 25 | 3,549 | 1.0 | 75.6 | 950 |
| Example 26 | 2,509 | 1.0 | 56.9 | 715 |
| Example 27 | 4,260 | 1.0 | 208.3 | 2,618 |
| Example 28 | 7,381 | 1.0 | 153.0 | 1,923 |
| Example 29 | 3,328 | 1.0 | 57.5 | 723 |
| Example 30 | 4,448 | 1.1 | 208.4 | 2,619 |
| Example 31 | 8,984 | 1.0 | 154.2 | 1,938 |
| Example 32 | 3,404 | 1.0 | 74.9 | 941 |
| Example 33 | 2,252 | 1.0 | 57.4 | 721 |
| Example 34 | 4,114 | 1.1 | 208.1 | 2,615 |
| Comparative Example 11 | 17,664 | 1.0 | 154.0 | 1,935 |
| Comparative Example 12 | 7,799 | 1.0 | 154.3 | 1,939 |
| Comparative Example 13 | 25,088 | 1.1 | 152.1 | 1,911 |
| Comparative Example 14 | 13,470 | 1.1 | 154.2 | 1,938 |
| Comparative Example 15 | 7,305 | 1.1 | 153.8 | 1,933 |
| Comparative Example 16 | 4,306 | 1.0 | 201.5 | 2,532 |

| Examples and Comparative Examples | Properties of magnetic recording medium | | | |
|---|---|---|---|---|
| | Br/Bm (−) | Gloss (%) | Surface roughness Ra (nm) | Young's modulus (relative value) |
| Example 24 | 0.89 | 238 | 6.4 | 142 |
| Example 25 | 0.90 | 189 | 6.2 | 143 |
| Example 26 | 0.90 | 183 | 6.1 | 145 |
| Example 27 | 0.89 | 194 | 6.7 | 140 |
| Example 28 | 0.91 | 240 | 5.8 | 143 |
| Example 29 | 0.90 | 191 | 6.0 | 145 |
| Example 30 | 0.88 | 198 | 6.4 | 145 |
| Example 31 | 0.90 | 239 | 6.0 | 144 |
| Example 32 | 0.91 | 190 | 5.9 | 145 |
| Example 33 | 0.91 | 192 | 5.9 | 146 |
| Example 34 | 0.89 | 200 | 6.5 | 141 |
| Comparative Example 11 | 0.83 | 193 | 19.9 | 131 |
| Comparative Example 12 | 0.85 | 205 | 13.1 | 130 |
| Comparative Example 13 | 0.76 | 181 | 30.4 | 114 |
| Comparative Example 14 | 0.83 | 196 | 17.8 | 131 |
| Comparative Example 15 | 0.88 | 231 | 7.1 | 136 |
| Comparative Example 16 | 0.88 | 186 | 8.0 | 137 |

| Examples and Comparative Examples | Properties of magnetic recording medium | | |
|---|---|---|---|
| | Linear absorption ($\mu m^{-1}$) | Durability | |
| | | Running durability (min) | Scratch resistance (−) |
| Example 24 | 1.45 | 29.4 | A |
| Example 25 | 1.49 | ≧30 | A |
| Example 26 | 1.43 | ≧30 | A |
| Example 27 | 1.41 | 28.8 | B |
| Example 28 | 1.80 | ≧30 | A |
| Example 29 | 1.74 | ≧30 | A |
| Example 30 | 1.44 | 29.6 | A |
| Example 31 | 1.42 | ≧30 | A |
| Example 32 | 1.47 | ≧30 | A |
| Example 33 | 1.49 | ≧30 | A |
| Example 34 | 1.62 | 28.9 | A |
| Comparative Example 11 | 1.28 | 12.6 | D |
| Comparative Example 12 | 1.26 | 14.1 | C |
| Comparative Example 13 | 1.49 | 10.3 | D |
| Comparative Example 14 | 1.30 | 13.8 | C |
| Comparative Example 15 | 1.51 | 19.1 | C |
| Comparative Example 16 | 1.40 | 18.3 | C |

What is claimed is:

1. A magnetic recording medium comprising:
a non-magnetic base film; and
a magnetic recording layer comprising a binder resin and magnetic composite particles having an average particle diameter of 0.02 to 0.70 μm, comprising magnetic particles as core particles,
a coating formed on surface of said magnetic particle, comprising at least one organosilicon compound selected from the group consisting of:
(1) organosilane compounds obtainable from alkoxysilane compounds, and
(2) polysiloxanes or modified polysiloxanes, and
a phthalocyanine-based pigments coat formed on said coating layer comprising said organosilicon compound, in an amount of 1 to 100 parts by weight based on 100 parts by weight of said magnetic particles.

2. A magnetic recording medium according to claim 1, wherein a coating layer comprising at least one compound selected from the group consisting of hydroxides of aluminum, oxides of aluminum, hydroxides of silicon and oxides of silicon is disposed between at least a part of the surface of the magnetic particle and the coating layer comprising the organosilicon compound.

3. A magnetic recording medium according to claim 1, wherein a coating comprising at least one organosilicon compound selected from the group consisting of organosilane compounds obtainable from alkoxysilane compounds and polysiloxanes or modified polysiloxanes, and a carbon black coat formed on at least a part of the surface of said coating layer comprising said organosilicon compound are disposed between at least a part of the surface of the magnetic particle and the coating layer comprising the organosilicon compound.

4. A magnetic recording medium according to claim 3, wherein a coating layer comprising at least one compound selected from the group consisting of hydroxides of aluminum, oxides of aluminum, hydroxides of silicon and oxides of silicon is disposed between at least a part of the surface of the magnetic particle and the coating layer comprising the organosilicon compound.

5. A magnetic recording medium according to claim 1, wherein said modified polysiloxanes are compounds selected from the group consisting of:
(A) polysiloxanes modified with at least one compound selected from the group consisting of polyethers, polyesters and epoxy compounds, and (B) polysiloxanes whose molecular terminal is modified with at least one group selected from the group consisting of carboxylic acid groups, alcohol groups and a hydroxyl group.

6. A magnetic recording medium according to claim 1, wherein said alkoxysilane compound is represented by the general formula (I):

wherein $R^1$ is $C_6H_5$—, $(CH_3)_2CHCH_2$— or n-$C_bH_{2b+1}$— (wherein b is an integer of 1 to 18); X is $CH_3O$— or $C_2H_5O$—; and a is an integer of 0 to 3.

7. A magnetic recording medium according to claim 6, wherein said alkoxysilane compound is methyltriethoxysilane, dimethyldiethoxysilane, phenyltriethoxysilane, diphenyldiethoxysilane, methyltrimethoxysilane, dimethyldimethoxysilane, phenyltrimethoxysilane, diphenyldimethoxysilane, isobutyltrimethoxysilane or decyltrimethoxysilane.

8. A magnetic recording medium according to claim 1, wherein said polysiloxanes are represented by the general formula (II):

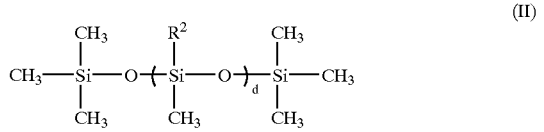

wherein $R^2$ is H— or $CH_3$—, and d is an integer of 15 to 450.

9. A magnetic recording medium according to claim 8, wherein said polysiloxanes are compounds having methyl hydrogen siloxane units.

10. A magnetic recording medium according to claim 5, wherein said polysiloxanes modified with at least one compound selected from the group consisting of polyethers, polyesters and epoxy compounds are represented by the general formula (III), (IV) or (V):

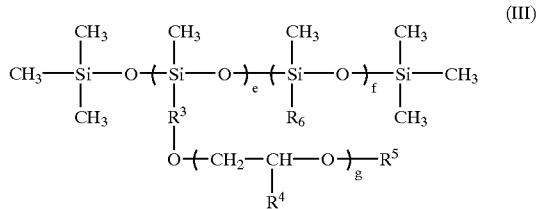

wherein $R^3$ is —$(—CH_2—)_h$—; $R^4$ is —$(—CH_2—)_i$—$CH_3$; $R^5$ is —OH, —COOH, —CH=$CH_2$, —$C(CH_3)$=$CH_2$ or —$(—CH_2—)_j$—$CH_3$; $R^6$ is —$(—CH_2—)_k$—$CH_3$; g and h are an integer of 1 to 15; i, j and k are an integer of 0 to 15; e is an integer of 1 to 50; and f is an integer of 1 to 300;

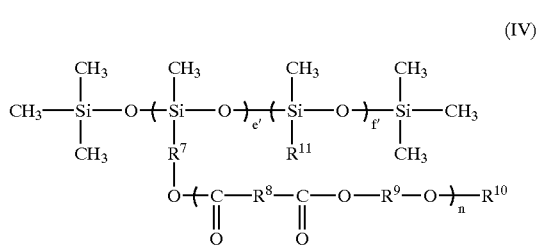

wherein $R^7$, $R^8$ and $R^9$ are —$(—CH_2—)_q$— and may be the same or different; $R^{10}$ is —OH, —COOH, —CH=$CH_2$, —$C(CH_3)$=$CH_2$ or —$(—CH_2—)_r$—$CH_3$; $R^{11}$ is —$(—CH_2—)_s$—$CH_3$; n and q are an integer of 1 to 15; r and s are an integer of 0 to 15; e' is an integer of 1 to 50; and f' is an integer of 1 to 300; or

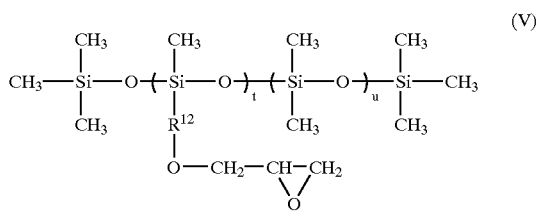

wherein $R^{12}$ is —$(—CH_2—)_v$—; v is an integer of 1 to 15; t is an integer of 1 to 50; and u is an integer of 1 to 300.

11. A magnetic recording medium according to claim 5, wherein said polysiloxanes whose molecular terminal is modified with at least one group selected from the group consisting of carboxylic acid groups, alcohol groups and a hydroxyl group are represented by the general formula (VI):

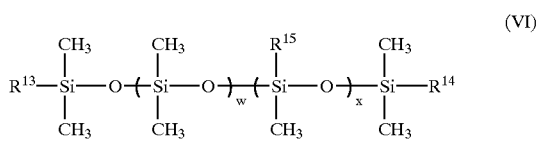

wherein $R^{13}$ and $R^{14}$ are —OH, $R^{16}$OH or $R^{17}$COOH and may be the same or different; $R^{15}$ is —$CH_3$ or —$C_6H_5$; $R^{16}$ and $R^{17}$ are —$(—CH_2—)_y$—; y is an integer of 1 to 15; w is an integer of 1 to 200; and x is an integer of 0 to 100.

12. A magnetic recording medium according to claim 1, wherein the amount of said coating organosilicon compounds is 0.02 to 5.0% by weight, calculated as Si, based on the total weight of the organosilicon compounds and said magnetic particles.

13. A magnetic recording medium according to claim 1, wherein said magnetic composite particles have an aspect ratio or plate ratio of 2:1 to 20:1, a blackness (L* value) of 14.5 to 24.0.

14. A magnetic recording medium according to claim 1, wherein said magnetic composite particles have a BET specific surface area value of 15 to 200 m²/g and a geometrical standard deviation of major axis diameter of 1.01 to 2.0.

15. A magnetic recording medium according to claim 1, which further has a coercive force of 39.8 to 318.4 kA/m and a squareness (residual magnetic flux density Br/saturation magnetic flux density Bm) of 0.82 to 0.95, a gloss of 170 to 300%, a surface roughness Ra of not more than 11.0 nm, a linear absorption coefficient of coating film of 1.20 to 5.0 $\mu m^{-1}$.

16. A magnetic recording medium according to claim 1, which further has a non-magnetic undercoat layer disposed between the non-magnetic base film and the magnetic recording layer.

17. Magnetic composite particles for a magnetic recording medium, having an average particle diameter of 0.02 to 0.70 $\mu$m, comprising:
  magnetic particles as core particles,
  a coating formed on surface of said magnetic particle, comprising at least one organosilicon compound selected from the group consisting of:
    (1) organosilane compounds obtainable from alkoxysilane compounds, and
    (2) polysiloxanes or modified polysiloxanes, and
  a phthalocyanine-based pigments coat formed on said coating layer comprising said organosilicon compound, in an amount of 1 to 100 parts by weight based on 100 parts by weight of said magnetic particles.

18. Magnetic composite particles according to claim 17, wherein a coating layer comprising at least one compound selected from the group consisting of hydroxides of aluminum, oxides of aluminum, hydroxides of silicon and oxides of silicon is disposed between at least a part of the surface of the magnetic particle and the coating layer comprising the organosilicon compound.

19. Magnetic composite particles according to claim 17, wherein a coating comprising at least one organosilicon compound selected from the group consisting of organosilane compounds obtainable from alkoxysilane compounds and polysiloxanes or modified polysiloxanes, and a carbon black coat formed on at least a part of the surface of said coating layer comprising said organosilicon compound are disposed between at least a part of the surface of the magnetic particle and the coating layer comprising the organosilicon compound.

20. Magnetic composite particles according to claim 17, wherein a coating layer comprising at least one compound selected from the group consisting of hydroxides of aluminum, oxides of aluminum, hydroxides of silicon and oxides of silicon is disposed between at least a part of the surface of the magnetic particle and the coating layer comprising the organosilicon compound.

21. Magnetic composite particles according to claim 17, wherein the amount of said coating organosilicon compounds is 0.02 to 5.0% by weight, calculated as Si, based on the total weight of the organosilicon compounds and said magnetic particles.

22. Magnetic composite particles according to claim 17, wherein said magnetic composite particles have an aspect ratio (average major axis diameter/average minor axis diameter) of 2:1 to 20:1, a blackness (L* value) of 14.5 to 24.

23. Magnetic composite particles according to claim 17, wherein said magnetic composite particles have a BET specific surface area value of 15 to 200 $m^2/g$ and a geometrical standard deviation of major axis diameter of 1.01 to 2.0.

24. A magnetic recording medium comprising:
a non-magnetic base film; and
a magnetic recording layer comprising a binder resin and magnetic composite particles having an average particle diameter of 0.02 to 0.70 $\mu$m, comprising:
magnetic acicular metal particles containing iron as a main component which contain Co, Al, Ni, P, Zn, Si, B or rare earth elements, or magnetic acicular iron alloy particles containing Co, Al, Ni, P, Zn, Si, B or rare earth elements, as core particles,
a coating formed on surface of said magnetic acicular particle, comprising at least-one organosilicon compound selected from the group consisting of:
(1) organosilane compounds obtainable from alkoxysilane compounds, and
(2) polysiloxanes or modified polysiloxanes, and
a phthalocyanine-based pigments coat formed on said coating layer comprising said organosilicon compound, in an amount of 1 to 100 parts by weight based on 100 parts by weight of said magnetic particles.

25. Magnetic composite particles for a magnetic recording medium, having an average particle diameter of 0.02 to 0.70 $\mu$m, comprising:
magnetic acicular metal particles containing iron as a main component which contain Co, Al, Ni, P, Zn, Si, B or rare earth elements, or magnetic acicular iron alloy particles containing Co, Al, Ni, P, Zn, Si, B or rare earth elements, as core particles,
a coating formed on surface of said magnetic acicular particle, comprising at least one organosilicon compound selected from the group consisting of:
(1) organosilane compounds obtainable from alkoxysilane compounds, and
(2) polysiloxanes or modified polysiloxanes, and
a phthalocyanine-based pigments coat formed on said coating layer comprising said organosilicon compound, in an amount of 1 to 100 parts by weight based on 100 parts by weight of said magnetic particles.

26. In a method of forming a magnetic recording medium comprising a non-magnetic base film, and a magnetic recording layer comprising a binder resin and magnetic particles, the improvement comprising using as magnetic particles magnetic composite particles having an average particle diameter of 0.02 to 0.70 $\mu$m, comprising:
magnetic particles as core particles,
a coating formed on surface of said magnetic particle, comprising at least one organosilicon compound selected from the group consisting of:
(1) organosilane compounds obtainable from alkoxysilane compounds, and
(2) polysiloxanes or modified polysiloxanes, and
a phthalocyanine-based pigments coat formed on said coating layer comprising said organosilicon compound, in an amount of 1 to 100 parts by weight based on 100 parts by weight of said magnetic particles.

27. The method according to claim 26, wherein a coating layer comprising at least one compound selected from the group consisting of hydroxides of aluminum, oxides of aluminum, hydroxides of silicon and oxides of silicon is disposed between at least a part of the surface of the magnetic particle and the coating layer comprising the organosilicon compound.

28. The method according to claim 26, wherein a coating comprising at least one organosilicon compound selected from the group consisting of organosilane compounds obtainable from alkoxysilane compounds and polysiloxanes or modified polysiloxanes, and a carbon black coat formed on at least a part of the surface of said coating layer comprising said organosilicon compound are disposed between at least a part of the surface of the magnetic particle and the coating layer comprising the organosilicon compound.

29. The method according to claim 26, wherein a coating layer comprising at least one compound selected from the group consisting of hydroxides of aluminum, oxides of aluminum, hydroxides of silicon and oxides of silicon is disposed between at least a part of the surface of the magnetic particle and the coating layer comprising the organosilicon compound.

* * * * *